(12) United States Patent
Yasunaga et al.

(10) Patent No.: US 10,754,195 B2
(45) Date of Patent: Aug. 25, 2020

(54) LIGHTING DEVICE AND DISPLAY DEVICE

(71) Applicant: SHARP KABUSHIKI KAISHA, Sakai, Osaka (JP)

(72) Inventors: Hirotoshi Yasunaga, Sakai (JP); Hisashi Watanabe, Sakai (JP); Youzou Kyoukane, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/240,627

(22) Filed: Jan. 4, 2019

(65) Prior Publication Data

US 2019/0212613 A1 Jul. 11, 2019

(30) Foreign Application Priority Data

Jan. 10, 2018 (JP) .................................. 2018-001789

(51) Int. Cl.
*G02F 1/13357* (2006.01)

(52) U.S. Cl.
CPC .. *G02F 1/133609* (2013.01); *G02F 1/133603* (2013.01); *G02F 1/133605* (2013.01); *G02F 2203/055* (2013.01)

(58) Field of Classification Search
None
See application file for complete search history.

(56) References Cited

U.S. PATENT DOCUMENTS

| | | | |
|---|---|---|---|
| 2007/0147073 A1* | 6/2007 | Sakai | G02B 6/0021 362/607 |
| 2008/0297020 A1 | 12/2008 | Wanninger et al. | |
| 2015/0241621 A1* | 8/2015 | Inui | G02F 1/133615 349/65 |
| 2018/0080625 A1* | 3/2018 | Yamada | F21V 9/30 |
| 2019/0129251 A1* | 5/2019 | Watanabe | G02B 5/206 |

FOREIGN PATENT DOCUMENTS

| | | |
|---|---|---|
| JP | 2009-510731 A | 3/2009 |
| JP | 2010-185906 A | 8/2010 |

* cited by examiner

*Primary Examiner* — Britt D Hanley
(74) *Attorney, Agent, or Firm* — ScienBiziP, P.C.

(57) ABSTRACT

The lighting device includes a light source, a light transmissive plate opposed to the light source, a light reflecting portion disposed on the light transmissive plate and providing at least transmitted light with a specific tint, and a coloring portion disposed on the light source and/or the light transmissive plate. The light transmissive plate includes a light source overlapping region and a light source peripheral region. The light reflecting portion is disposed with a higher distribution density in the light source overlapping region than in the light source peripheral region. The coloring portion colors light travelling from the light source toward the light source overlapping region with a tint having a complementary relationship with the specific tint, or colors light travelling from the light source toward the light source peripheral region with a tint having a corresponding or similar color relationship with the specific tint.

11 Claims, 14 Drawing Sheets

LIGHTING DEVICE AND DISPLAY DEVICE

CROSS REFERENCE TO RELATED APPLICATION

This application claims priority from Japanese Patent Application No. 2018-001789 filed on Jan. 10, 2018. The entire contents of the priority application are incorporated herein by reference.

TECHNICAL FIELD

The technology described herein relates to a lighting device and a display device.

BACKGROUND

Conventional liquid crystal display devices are equipped with a lighting device. The lighting device typically includes a light emitting diode for generating light; a first optical element and a second optical element each of which includes one light input surface and one light output surface for shaping light; and an optical axis extending through the light emitting diode, the first optical element, and the second optical element. The light output surface of the first optical element is configured to cause a predetermined light component of the light generated by the light emitting diode to be refracted from the optical axis before entering the second optical element. The light output surface of the second optical element is configured to cause the light component to be further refracted from the optical axis. An example of such lighting device is disclosed in Japanese Translation of PCT International Application Publication No. JP-T-2009-510731.

The lighting device typically includes optical sheets, such as a luminance uniformization sheet. The luminance uniformization sheet includes an optically transmissive base material. On at least one side of the optically transmissive base material, a white diffusion layer is formed by printing in a pattern configured to enable uniformization and output of light having a non-uniform luminance distribution. The portion in which the white diffusion layer is formed has a transmittance such that, when the optical transmittance with respect to the wavelength of 436 nm is one, the optical transmittance with respect to the wavelength of 544 nm and the wavelength of 612 nm is in a range of from 0.8 to 1.6. An example of such optical sheet is disclosed in Japanese Unexamined Patent Application Publication No. 2010-185906.

In the lighting device disclosed in Japanese Translation of PCT International Application Publication No. JP-T-2009-510731, the first optical element and the second optical element are both configured to refract light advantageously in a direction away from the optical axis. In this way, it is made possible to easily expand the region, in the screen to be illuminated by the lighting device, that is illuminated by the light emitting diode used as the light source, even when the distance from the light emitting diode to the screen is set. On the other hand, in the luminance uniformization sheet disclosed in Japanese Unexamined Patent Application Publication No. 2010-185906, the light is diffusely reflected by the white diffusion layer, whereby the input light having a non-uniform luminance distribution can be uniformized and output. The optical reflectance of the white diffusion layer is higher than the optical transmittance thereof. The white diffusion layer, however, may cause a specific tint in the transmitted light or reflected light, depending on the material used. As a result, color unevenness may be caused in the output light of the lighting device.

SUMMARY

The technology described herein was made in view of the above circumstances. An object is to suppress color unevenness.

A lighting device according to the technology described herein includes a light source, a light transmissive plate, a light reflecting portion; and a coloring portion. The light transmissive plate is opposed to the light source with an interval therebetween and is transmissive to light. The light reflecting portion is disposed on a plate surface of the light transmissive plate, has a higher optical reflectance than an optical transmittance, and provides at least transmitted light with a specific tint. The coloring portion is disposed on at least one of the light source and the light transmissive plate. The light transmissive plate is sectioned into a light source overlapping region overlapping the light source, and a light source peripheral region disposed around the light source overlapping region. The light reflecting portion is disposed so as to have a higher distribution density in the light source overlapping region than in the light source peripheral region. The coloring portion colors light travelling from the light source toward the light source overlapping region with a tint having a complementary relationship with the specific tint, or colors light travelling from the light source toward the light source peripheral region with a tint having a corresponding or similar color relationship with the specific tint.

Thus, the light reflecting portion is disposed so as to have a higher distribution density in the light source overlapping region than in the light source peripheral region on the plate surface of the light transmissive plate. Accordingly, a large portion of the light travelling from the light source toward the light source overlapping region is reflected by the light reflecting portion, and is made less likely to pass through the light source overlapping region. On the other hand, in the light source peripheral region of the light transmissive plate, the distribution density of the light reflecting portion is lower than in the light source overlapping region. Accordingly, the light travelling from the light source toward the light source peripheral region, and the light that has been reflected by the light reflecting portion in the light source overlapping region and then travelling toward the light source peripheral region are made more likely to pass through the light source peripheral region. In this way, a difference is less likely to be caused between the amount of output light from the light source overlapping region and the amount of output light from the light source peripheral region. Accordingly, luminance unevenness is less likely to be caused.

The light reflecting portion has the characteristics such that at least the transmitted light is given a specific tint. Accordingly, color unevenness may be caused in the output light from the light transmissive plate. In this respect, at least one of the light source and the light transmissive plate is provided with the coloring portion for coloring the light travelling from the light source toward the light source overlapping region or the light travelling from the light source toward the light source peripheral region. Specifically, the coloring portion colors the light travelling from the light source toward the light source overlapping region with a tint having a complementary relationship with a specific tint, or colors the light travelling from the light source toward the light source peripheral region with a tint having a corresponding or similar color relationship with a specific tint. The light travelling from the light source toward the light source overlapping region is given a specific tint when passing through the light reflecting portion disposed with a higher distribution density in the light source overlapping region. In this respect, when the light travelling from the light source toward the light source overlapping region is given a tint having a complementary relationship with a specific tint by the coloring portion, the output light from the light source overlapping region is whitened, thereby reducing a difference in tint that may be caused between the output light from the light source overlapping region and the output light from the light source peripheral region. On the other hand, in the light source peripheral region, the light reflecting portion is disposed with a lower distribution density. Accordingly, only a small portion of the light travelling from the light source toward the light source peripheral region passes through the light reflecting portion, and the light is less likely to be subjected to the coloring action due to the light reflecting portion. In this respect, when the light travelling from the light source toward the light source peripheral region is colored by the coloring portion with a tint having a corresponding or similar color relationship with a specific tint, it becomes possible to reduce a difference in tint that may be caused between the output light from the light source peripheral region and the output light from the light source overlapping region which is given a specific tint when passing through the light reflecting portion, which is disposed with a higher distribution density in the light source overlapping region. Thus, it becomes less likely that color unevenness is caused in the output light from the lighting device.

According to the technology described herein, color unevenness can be suppressed.

DETAILED DESCRIPTION

First Embodiment

Figure 1:
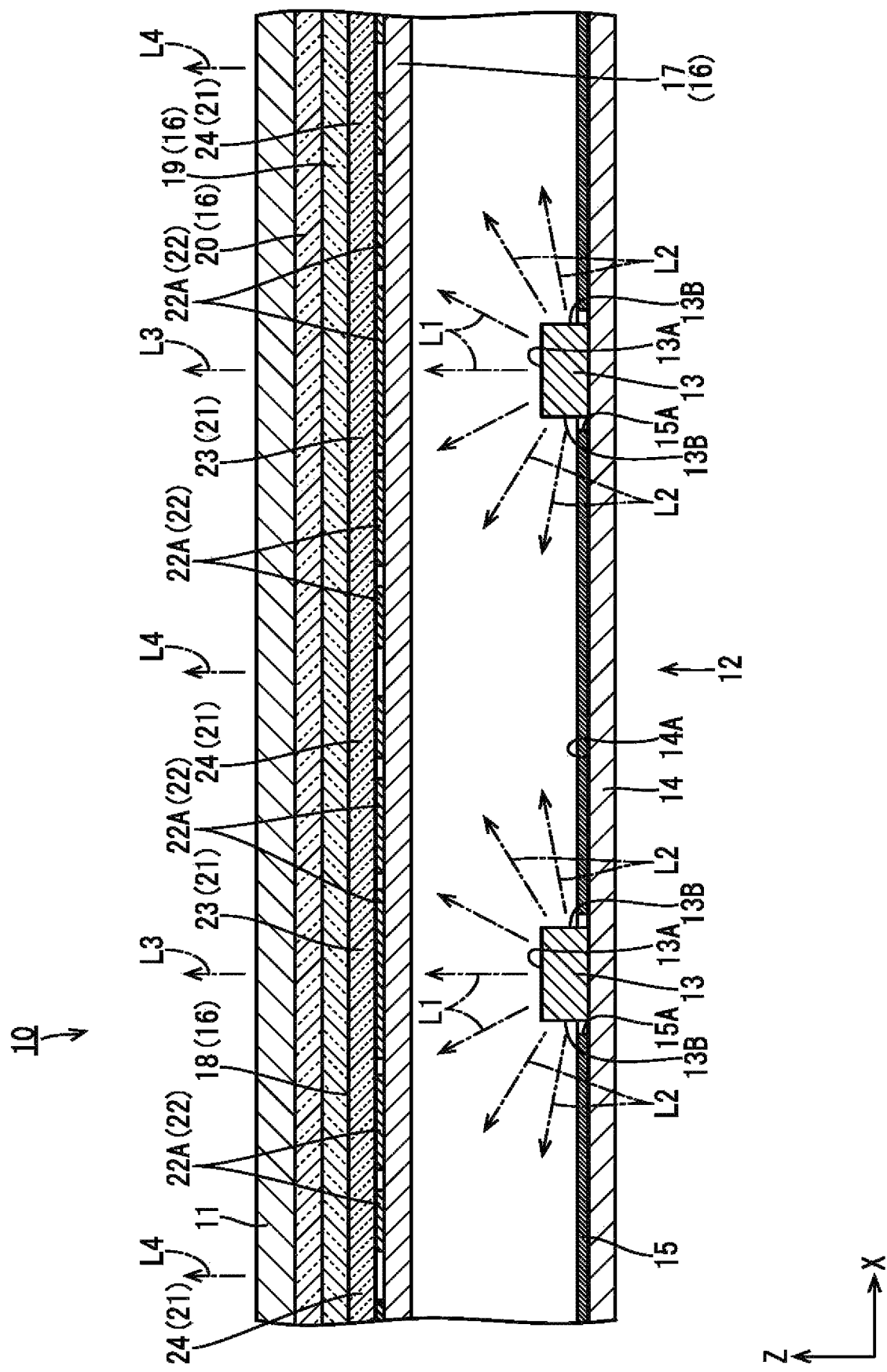
FIG. 1 is a cross sectional view of a liquid crystal display device according to a first embodiment.

A first embodiment of the technology described herein will be described with reference to FIG. 1 to FIG. 8. In the present embodiment, a liquid crystal display device (display device) 10 will be described by way of example. In some of the drawing figures, the X-axis, the Y-axis, and the Z-axis are depicted, the respective axial directions corresponding to the directions indicated in the drawing figures. The top of FIG. 1 and FIG. 4 will be referred to as the front side, and the bottom side thereof will be referred to as the back side.

As illustrated in FIG. 1, the liquid crystal display device 10 is provided with at least a liquid crystal panel (display panel) 11 configured to display an image, and a backlight device (lighting device) 12. The backlight device 12 is an external light source which is disposed on the back side (light entry side) with respect to the liquid crystal panel 11, and which irradiates the liquid crystal panel 11 with light for presenting a display. The liquid crystal panel 11 includes a pair of glass substrates bonded to each other with a predetermined gap therebetween in which liquid crystal is sealed. One glass substrate (array substrate, active matrix substrate) is provided with, for example: switching elements (such as TFTs) connected to source wires and gate wires which are orthogonal to each other; pixel electrodes connected to the switching elements; and an alignment film. The other glass substrate (counter substrate, CF substrate) is provided with, for example: a color filter in which colored portions of R (red), G (green), B (blue) and the like are arranged in a predetermined arrangement; a black matrix partitioning the color filter; and an alignment film. A polarizing plate is disposed on the outer side of each glass substrate.

The backlight device 12 will be described. As illustrated in FIG. 1, the backlight device 12 is provided with: LEDs 13 as a light source; an LED substrate (light source substrate) 14 on which the LEDs 13 are mounted; a reflective sheet 15 disposed so as to cover a surface of the LED substrate 14 and reflecting light; and an optical sheet (optical member) 16 opposed to the LEDs 13 with an interval therebetween. Thus, the backlight device 12 according to the present embodiment is of the so-called direct type in which the LEDs 13 are disposed directly under the liquid crystal panel 11 and the optical sheets 16. Preferably, the backlight device 12 is provided with a frame (not illustrated) which holds the outer peripheral edges of the optical sheets 16. In the following, constituent components of the backlight device 12 will be described.

Figure 2:
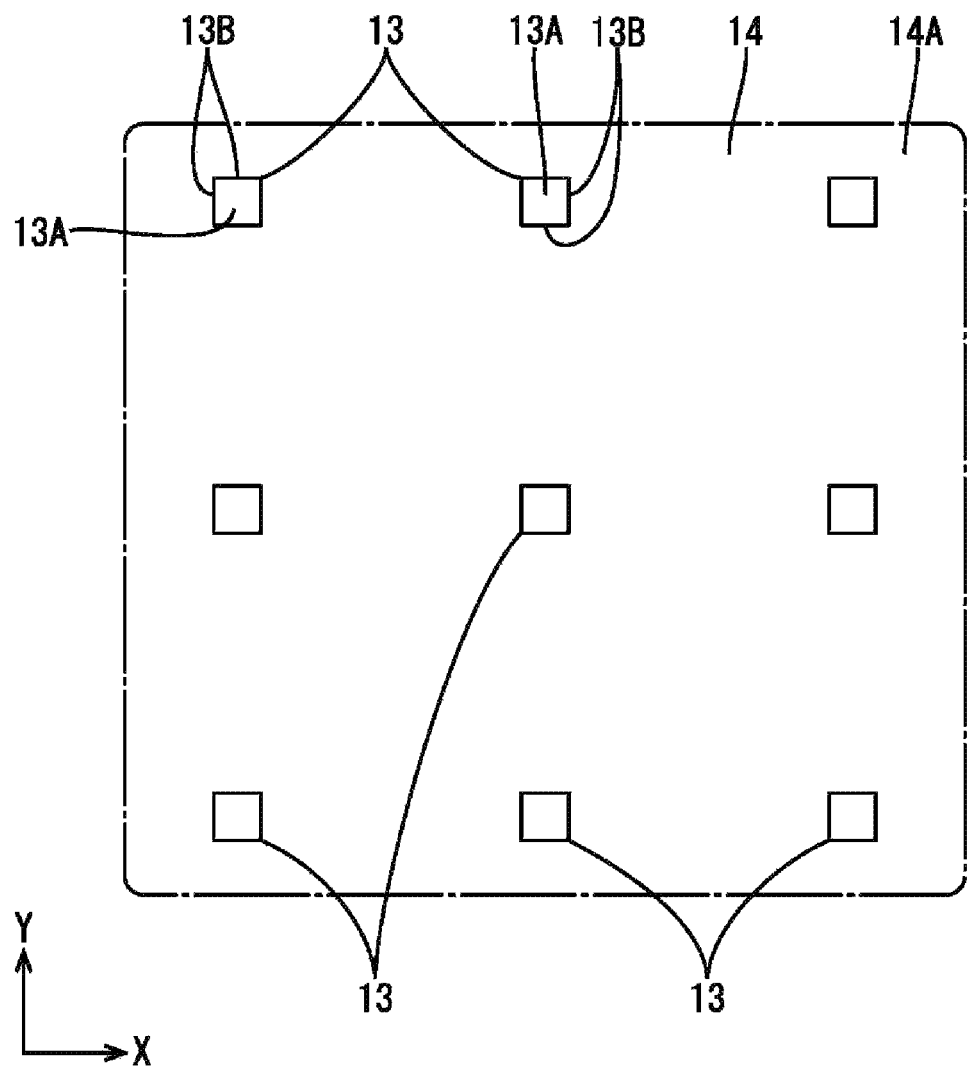
FIG. 2 is a plan view illustrating a planar arrangement of LEDs on an LED substrate configuring a backlight device provided in the liquid crystal display device.

As illustrated in FIG. 1 and FIG. 2, LEDs 13 are disposed side by side with an interval therebetween in each of the X-axis direction and the Y-axis direction, forming a matrix (having rows and columns) within a plate surface of the LED substrate 14. The LEDs 13 each include a top light emitting surface 13A disposed at the top surface and opposing the optical sheets 16, and side light emitting surfaces 13B disposed on side surfaces. The LEDs 13 have a rectangular planar shape. Accordingly, each of the LEDs 13 has four side light emitting surfaces 13B. The light emitting surfaces 13A, 13B of the LEDs 13 are flat. The structure of the LEDs 13 will be described in detail later.

As illustrated in FIG. 1, the LED substrate 14 has the shape of a plate with a plate surface which is parallel with plate surfaces of the reflective sheet 15 and the optical sheets 16. The LED substrate 14 has a plate surface on the front side which is opposed to the plate surfaces of the reflective sheet 15 and the optical sheets 16, and which forms a mounting surface 14A for surface-mounting the LEDs 13. A wiring pattern (not illustrated) made of a metal film of copper foil and the like is formed on the mounting surface 14A of the LED substrate 14. The LEDs 13 are powered using the wiring pattern.

The reflective sheet 15 is made of synthetic resin and has a white surface for achieving high optical reflectivity. As illustrated in FIG. 1, the reflective sheet 15 is laminated so as to cover the mounting surface 14A of the LED substrate 14 substantially entirely from the front side. The reflective sheet 15 has LED passing holes 15A formed at positions overlapping the LEDs 13 to pass the LEDs 13 separately. LED passing holes 15A are disposed side by side with an interval therebetween in each of the X-axis direction and the Y-axis direction, forming a matrix aligned with the LEDs 13 on the LED substrate 14.

As illustrated in FIG. 1, the optical sheets 16 have a sheet shape with a plate surface which is parallel with the plate surfaces of the liquid crystal panel 11, the LED substrate 14 and the like. The optical sheets 16 are interposed between the liquid crystal panel 11 and the LEDs 13 with respect to the Z-axis direction. The optical sheets 16 have the function of causing the light emitted from the LEDs 13 to be output toward the liquid crystal panel 11 while affording a predetermined optical action to the light. A plate surface on the back side of the optical sheets 16 which is opposed to the mounting surface 14A of the LED substrate 14 forms a light entry surface via which light enters. A plate surface on the front side of the optical sheets 16 which is opposed to the liquid crystal panel 11 forms a light exit surface via which light exits. The optical sheets 16 include four sheets laminated together, including, in order from the back side: a diffusing sheet 17; a light transmitting function-equipped reflective sheet (light transmitting function-equipped reflective plate material) 18; a first lens sheet 19; and a second lens sheet 20. The diffusing sheet 17 includes a number of diffusing particles for diffusing light diffusely blended into a base material of substantially transparent synthetic resin. The two lens sheets 19, 20 each include a base material of substantially transparent synthetic resin. The base material has a plate surface on which a number of unit lenses extending in the X-axis direction or the Y-axis direction are arranged side by side in a direction (the Y-axis direction or the X-axis direction) orthogonal to the direction of extension. The two lens sheets 19, 20 afford a light collecting action to the input light selectively with respect to the direction in which the unit lens are arranged.

Figure 3:
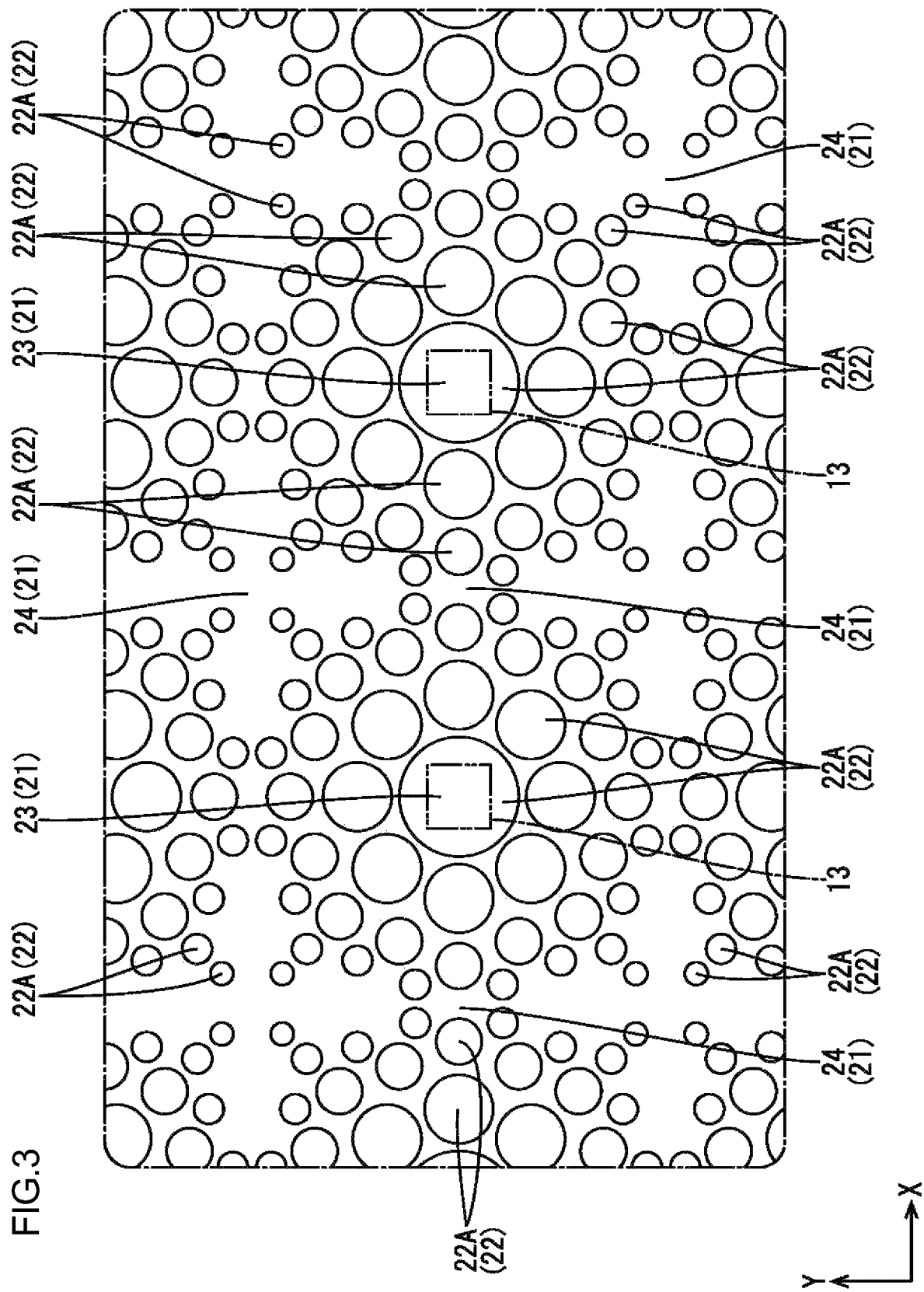
FIG. 3 is a plan view illustrating a pattern of light reflecting portions of a light transmissive plate configuring the backlight device.

The light transmitting function-equipped reflective sheet 18 will be described. As illustrated in FIG. 1, the light transmitting function-equipped reflective sheet 18 includes a light transmissive plate 21 which is opposed to the LEDs 13 with an interval provided on the front side thereof, and light reflecting portions 22 disposed on a plate surface of the light transmissive plate 21. The light transmissive plate 21 is made of substantially transparent synthetic resin (such as acrylic resin), and is transmissive to light (visible light rays). The light transmissive plate 21 is sectioned into an LED overlapping region (light source overlapping region) 23 which overlaps the LEDs 13 as viewed in plan, and an LED peripheral region (light source peripheral region) 24 which does not overlap the LEDs 13 as viewed in plan and is disposed around the LED overlapping region 23. The light reflecting portions 22 are made of white ink (white paint) of which the optical reflectance is higher than the optical transmittance. The light reflecting portions 22 are formed on the plate surface (light entry surface) on the back side of the light transmissive plate 21 by printing, such as screen printing, printing using an inkjet device or a dispenser device, or gravure printing. It is also possible to form the light reflecting portions 22 by vapor deposition, for example. As illustrated in FIG. 3, the light reflecting portions 22 are made of light reflecting dots 22A which are patterned to have varying distributions in accordance with the distance from the LEDs 13. Specifically, the light reflecting dots 22A of the light reflecting portions 22 have a circular planar shape, for example, with the diameter becoming greater with decreasing distance from the LEDs 13 and becoming smaller with increasing distance from the LEDs 13 as viewed in plan. In this way, the distribution density of the light reflecting portions 22 on the plate surface of the light transmissive plate 21 becomes relatively greater in the LED overlapping region 23, and relatively smaller in the LED peripheral region 24. In other words, the areal ratio of the region in which the light reflecting portions 22 are not formed on the plate surface of the light transmissive plate 21 becomes relatively small in the LED overlapping region 23 and becomes relatively large in the LED peripheral region 24. It may be said that the region in which the light reflecting portions 22 are not formed on the light transmissive plate 21 is a light transmissive portion that does not afford the reflecting action due to the light reflecting portions 22 and allows light to pass therethrough. In this configuration, a large portion of the light L1 travelling from the LEDs 13 toward the LED overlapping region 23 is reflected by the light reflecting portions 22 having a higher distribution density, and is less likely to pass through the LED overlapping region 23. On the other hand, the light L2 travelling from the LEDs 13 toward the LED peripheral region 24, and light reflected by the light reflecting portions 22 in the LED overlapping region 23 and then travelling toward the LED peripheral region 24 are less likely to be reflected by the light reflecting portions 22 having a low distribution density and are more likely to pass through the LED peripheral region 24. In this way, it becomes less likely that a difference is caused between the amount of output light from the LED overlapping region 23 and the amount of output light from the LED peripheral region 24. Accordingly, it becomes less likely that luminance unevenness is caused.

As described above, the light reflecting portions 22 reflect most of the light and transmits some of the light. Depending on the material characteristics of the light reflecting portions 22, color unevenness may be caused in the transmitted light or reflected light from the light reflecting portions 22. In the present embodiment, the light reflecting portions 22 use material (such as titanium oxide, barium sulfate, zinc oxide) having characteristics that tend to cause color unevenness having a blue tint with respect to the reflected light, and color unevenness having a yellow tint in the transmitted light. Specifically, in the light reflecting portions 22 according to the present embodiment, the optical transmittance has a wavelength dependency such that the optical transmittance is high (optical absorbance is low) selectively with respect to a wavelength region belonging to yellow (such as from 580 nm to 600 nm), and such that the optical transmittance is low (optical absorbance is high) with respect to light of wavelength regions belonging to colors other than yellow (blue and red). Meanwhile, in the light reflecting portions 22 according to the present embodiment, the optical reflectance has a wavelength dependency such that the optical reflectance is high (optical absorbance is low) selectively with respect to a light wavelength region belonging to blue (such as from 420 nm to 500 nm), and such that the optical reflectance is low (optical absorbance is high) with respect to light of a wavelength region belonging to colors (green and red) other than blue. Thus, the light reflecting portions 22 afford a coloring action to the transmitted light and the reflected light. As a result, color unevenness may be caused in the output light from the light transmissive plate 21.

Figure 4:
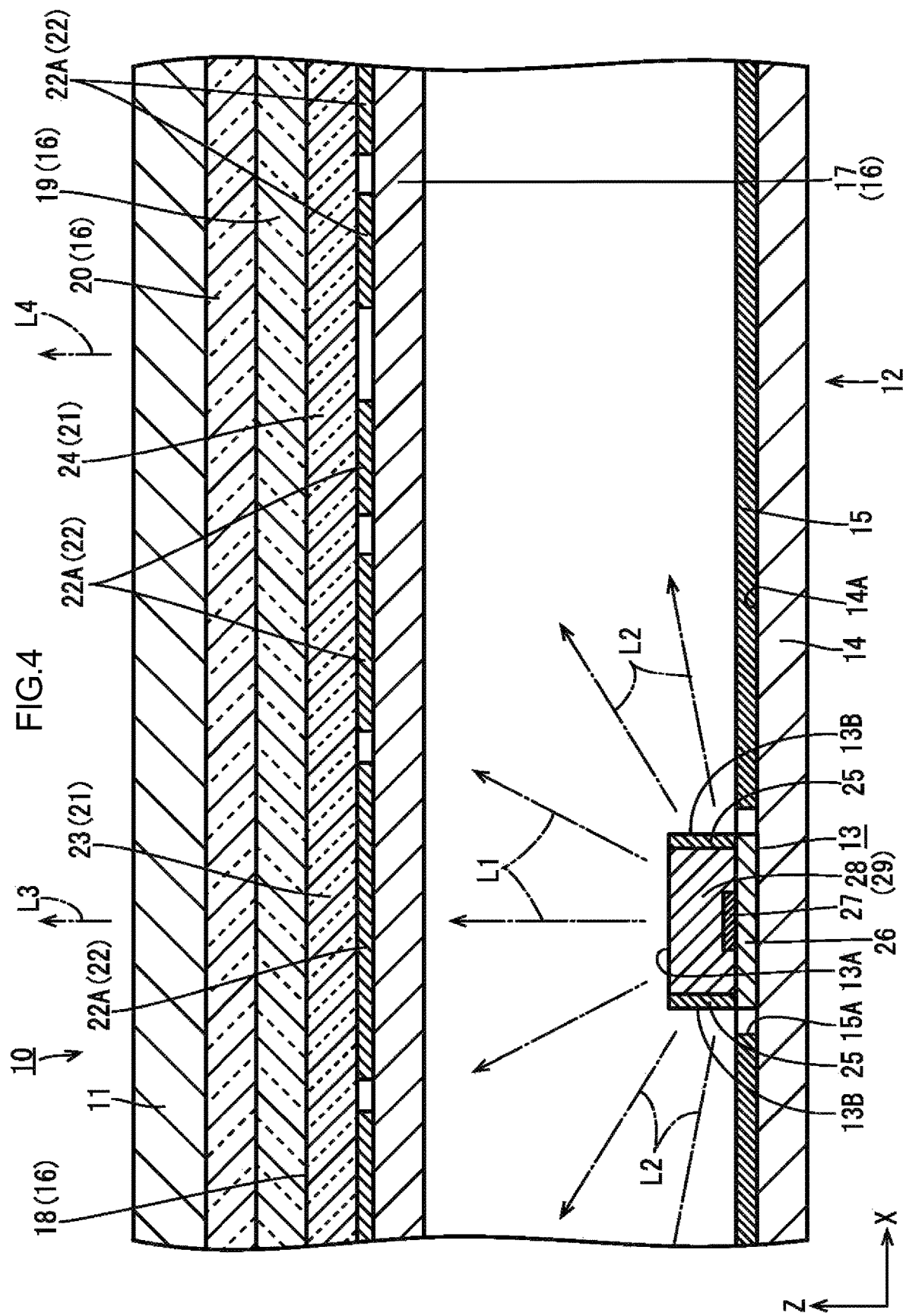
FIG. 4 is a cross sectional view illustrating an LED configuring the backlight device, and light reflecting portions of the light transmissive plate.

Accordingly, as illustrated in FIG. 4, the LEDs 13 provided in the backlight device 12 according to the present embodiment include a coloring portion 25 for coloring the light L2 travelling from the LEDs 13 toward the LED peripheral region 24 with a yellow tint that is in a corresponding color relationship with the yellow tint of the transmitted light from the light reflecting portions 22. The coloring portion 25 is made of a substantially transparent synthetic resin material containing a predetermined concentration of a yellow pigment. The pigment selectively absorbs light of wavelength regions (blue light, green light, and red light) other than the wavelength region belonging to yellow. The configuration of the LEDs 13 will be described in greater detail. The LEDs 13 each include at least a substrate portion 26 fixedly attached to the mounting surface 14A of the LED substrate 14, an LED element (semiconductor light emitting element) 27 mounted to the substrate portion 26, and a sealing material 28 sealing the LED element 27. The LED element 27 is a semiconductor of a semiconductor material, such as InGaN. For example, the LED element 27 emits a single-color light (single-color light of blue) of a wavelength included in a wavelength region belonging to blue (such as from 420 nm to 500 nm) when a voltage is applied thereto in a forward direction. The sealing material 28 is made of a base material of a substantially transparent thermosetting resin material (such as epoxy resin material or silicone resin material) in which a phosphor is diffusely blended. The phosphor is included in the sealing material 28 to convert the wavelength of the blue light from the LED element 27 into a longer wavelength of light. Specifically, for example, the phosphor may include a green phosphor for emitting green light by wavelength conversion, a red phosphor for emitting red light by wavelength conversion, and a yellow phosphor for emitting yellow light by wavelength conversion. The LEDs 13 generally emit light having the color of substantially white, using the blue light emitted from the LED element 27 and the light emitted from the phosphor included in the sealing material 28. In the present embodiment, the content of the phosphor included in the sealing material 28, for example, is adjusted such that white light having a slightly bluish tint is emitted.

Figure 5:
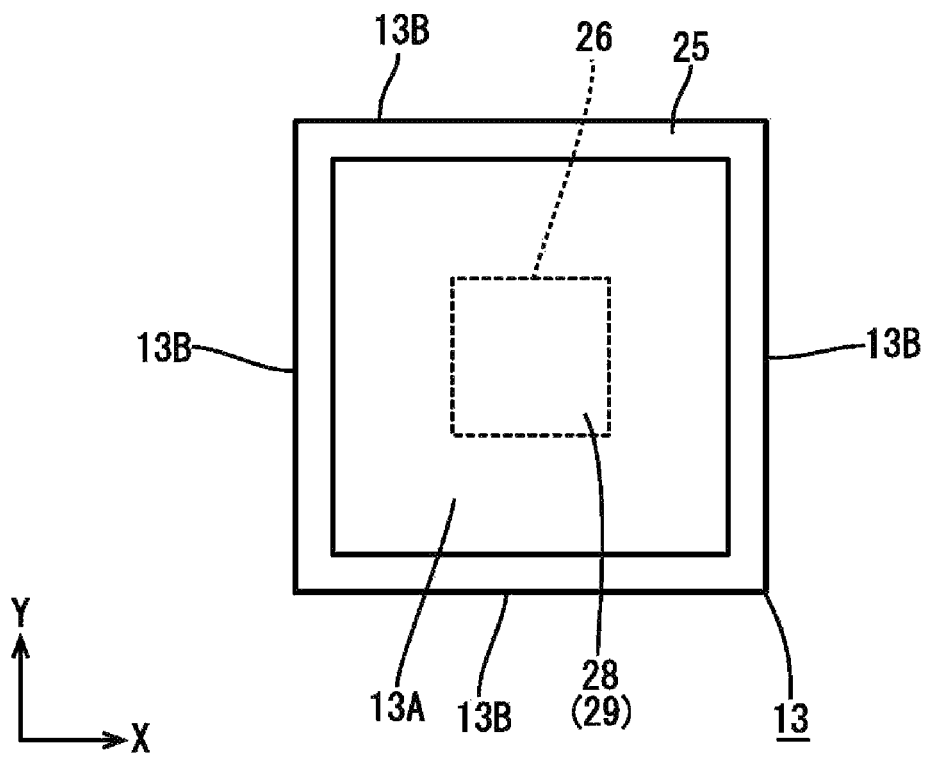
FIG. 5 is a plan view of the LED.

In the LEDs 13 thus configured, as illustrated in FIG. 4 and FIG. 5, the coloring portion 25 is disposed on the side light emitting surfaces 13B. The coloring portion 25 is disposed on all of the four side light emitting surfaces 13B of the LEDs 13, and is arranged to surround the sealing material 28 entirely as viewed in plan. As illustrated in FIG. 4, the LEDs 13 are configured such that the light emitted from the top light emitting surface 13A directly irradiates mainly the LED overlapping region 23 of the light transmissive plate 21, and such that the light emitted from the side light emitting surfaces 13B directly irradiates mainly the LED peripheral region 24 of the light transmissive plate 21. The coloring portion 25 is disposed on the side light emitting surfaces 13B. In this way, it becomes possible to reliably afford the coloring action of the coloring portion 25 to the light L2 travelling from the side light emitting surfaces 13B toward the LED peripheral region 24 of the light transmissive plate 21. As described above, the light supplied from the sealing material 28 to the coloring portion 25 in the LEDs 13 is white light having a blue tint. As the coloring portion 25 affords the yellow-tinting coloring action, the white light becomes slightly yellow-tinted white light. Thus, the light L1 emitted from the top light emitting surface 13A of the LEDs 13 toward the LED overlapping region 23 becomes white light having a blue tint due to the coloring action of the sealing material 28. On the other hand, the light L2 emitted from the side light emitting surfaces 138 toward the LED peripheral region 24 becomes slightly yellow-tinted white light due to the coloring action of the coloring portion 25. The light L1 travelling from the top light emitting surface 13A of the LEDs 13 toward the LED overlapping region 23 is given a yellow tint as the light passes through the light reflecting portions 22 disposed with a high distribution density in the LED overlapping region 23. However, the light L1 is originally the white light having a blue tint due to the coloring action of the sealing material 28. Accordingly, the output light L3 from the LED overlapping region 23 becomes white light having virtually no specific tint. Meanwhile, only a small amount of the light L2 emitted from the side light emitting surfaces 13B of the LEDs 13 toward the LED peripheral region 24 passes through the light reflecting portions 22 disposed with a low distribution density in the LED peripheral region 24. Thus, the light L2 is less likely to be subjected to the coloring action of the light reflecting portions 22 during passage therethrough. However, the light supplied to the LED peripheral region 24 includes the light that has been reflected by the light reflecting portions 22 in the LED overlapping region 23 and then repeatedly reflected between the reflective sheet 15 and the light reflecting portions 22, where the repeatedly reflected light has a blue tint due to the coloring action provided by the light reflecting portions 22 during the reflections. On the other hand, the light L2 emitted from the side light emitting surfaces 138 of the LEDs 13 toward the LED peripheral region 24 is the slightly yellow-tinted white light. Accordingly, the output light L4 from the LED peripheral region 24 becomes white light having virtually no specific tint. In this way, both the output light L3 from the LED overlapping region 23 and the output light L4 from the LED peripheral region 24 become white light having virtually no specific tint. As a result, a difference in tint is almost eliminated, and it becomes less likely that color unevenness is caused in the output light from the light transmitting function-equipped reflective sheet 18 and the backlight device 12. In addition, because the output light from the backlight device 12 becomes uniform white light having virtually no specific tint, it becomes easy to make settings relating to display gradation in the liquid crystal panel 11 that presents a display using the output light, thus enhancing convenience and the like. The sealing material 28 according to the present embodiment may be considered to be a second coloring portion 29 for coloring the light L1 travelling from the LEDs 13 toward the LED overlapping region 23 with a tint (blue tint) having a complementary relationship with the tint (yellow tint) presented by the coloring portion 25.

Figure 6:
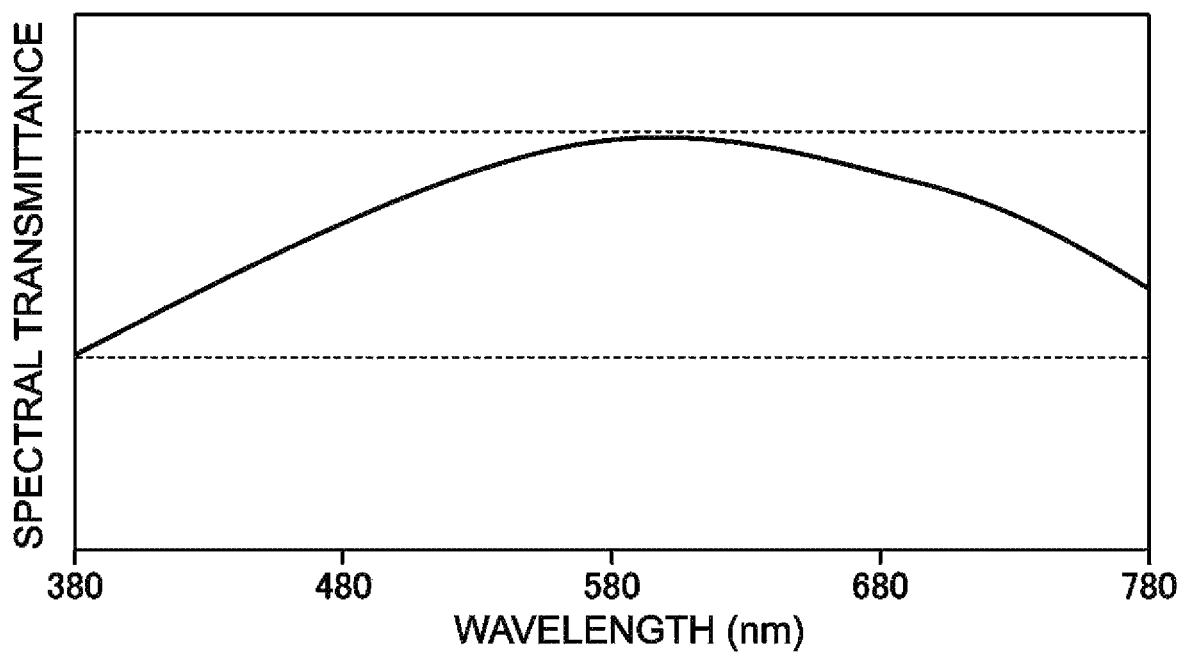
FIG. 6 is a graph depicting the spectral transmittance of the light reflecting portion.
Figure 7:
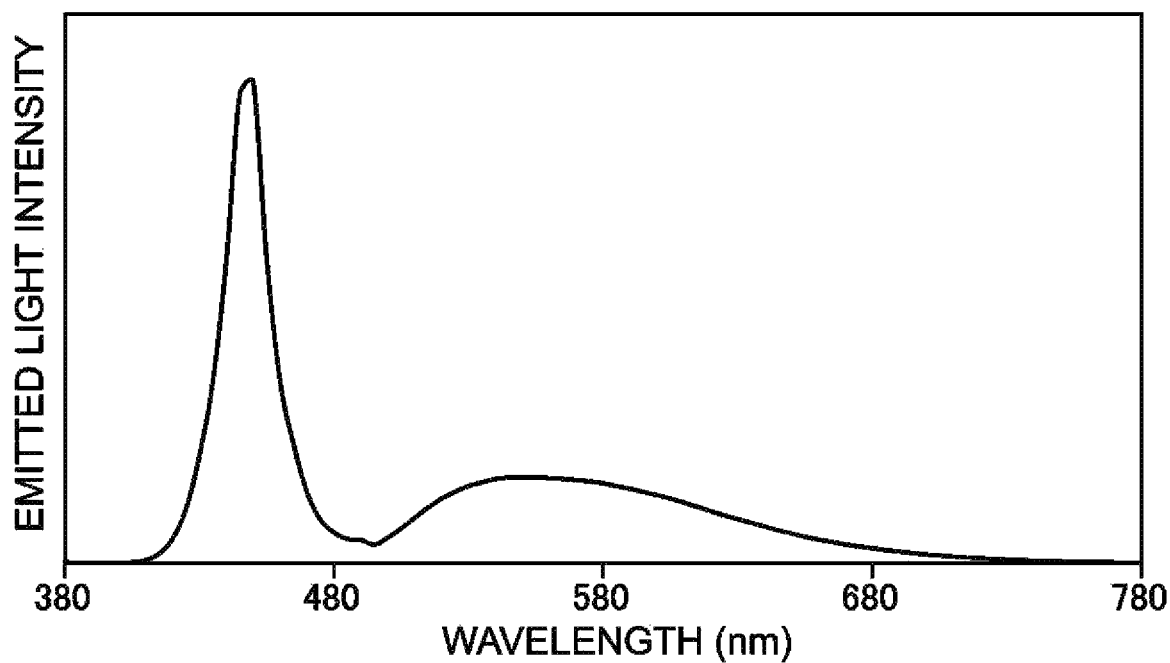
FIG. 7 is a graph depicting the emission spectrum of the LED.
Figure 8:
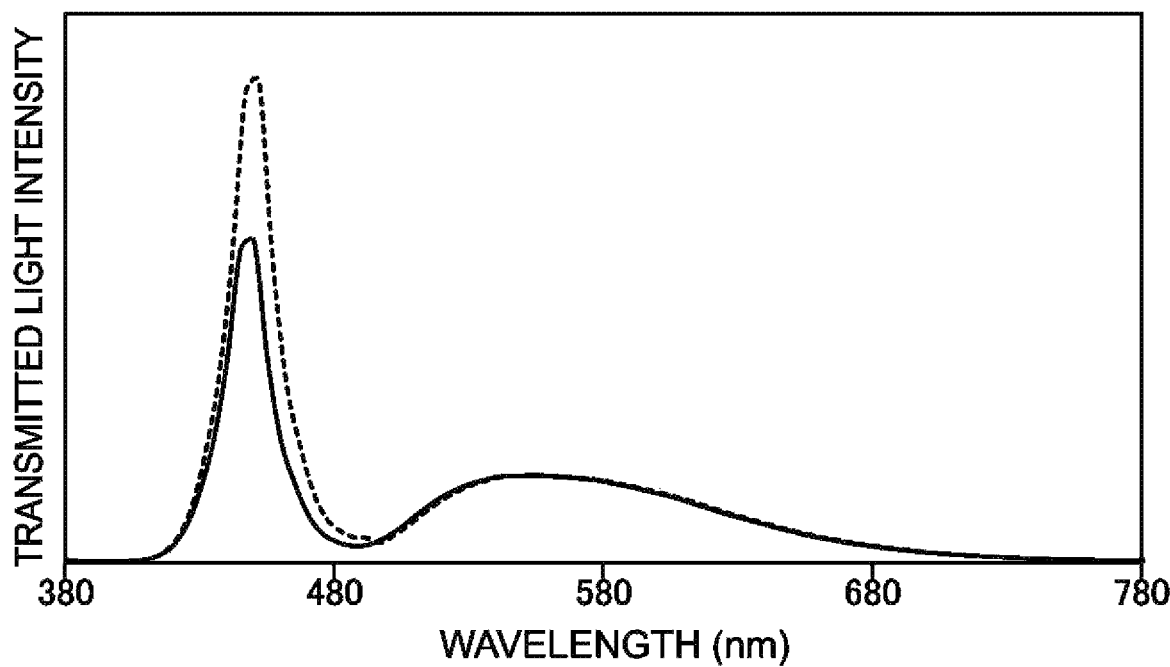
FIG. 8 is a graph depicting the transmission spectrum of the light reflecting portion.

The relationship in coloring action between the light reflecting portions 22 and the coloring portion 25 will be described. Preferably, the light reflecting portions 22 and the coloring portion 25 have substantially the same wavelength dependency with respect to optical transmittance. First, the spectral transmission characteristics of the light reflecting portions 22 will be described with reference to FIG. 6. FIG. 6 is a graph depicting the spectral transmittance of the light reflecting portions 22, in which the horizontal axis shows the wavelength of light (unit: nm), and the vertical axis shows the spectral transmittance (no unit). FIG. 6 indicates that the light reflecting portions 22 have the highest spectral transmittance in a wavelength region of from 580 nm to 600 nm, i.e., the wavelength region belonging to yellow, and has lower spectral transmittance in the other wavelength regions, the spectral transmittance tending to be the lowest in the wavelength region of from 420 nm to 500 nm, i.e., the wavelength region belonging to blue. The light emitting characteristic of the LEDs 13 will be described with reference to FIG. 7. FIG. 7 is a graph depicting the emission spectrum of the LEDs 13 without the coloring portion 25, in which the horizontal axis shows the wavelength of light (unit: nm) and the vertical axis shows the emitted light intensity (no unit). FIG. 7 indicates that the LEDs 13 have the highest emitted light intensity in the wavelength region belonging to blue, and have lower emitted light intensity in the other wavelength regions (from 480 nm to 780 nm), i.e., the wavelength region belonging to green, the wavelength region belonging to yellow, and the wavelength region belonging to red. As the light from the LEDs 13 having the emission spectrum passes through the light reflecting portions 22, the light having the spectral transmission characteristics depicted in FIG. 8 is produced. FIG. 8 is a graph depicting the transmission spectrum of the light reflecting portions 22, in which the horizontal axis shows the wavelength of light (unit: nm) and the vertical axis shows the transmitted light intensity (no unit). In FIG. 8, the graph relating to the emission spectrum of the LEDs 13 is indicated by dashed line. FIG. 8 indicates that as the light emitted from the LEDs 13 passes through the light reflecting portions 22, the transmitted light intensity in the wavelength region belonging to blue is locally decreased. Accordingly, the transmitted light from the light reflecting portions 22, i.e., the output light L3 from the LED overlapping region 23 of the light transmissive plate 21, is given a yellow tint. Meanwhile, the coloring portion 25 has substantially the same spectral transmission characteristics as those of the light reflecting portions 22 indicated in FIG. 6. In this way, the light emitted via the side light emitting surfaces 13S from the sealing material 28 through the coloring portion 25 in the LEDs 13 becomes light having the spectral transmission characteristics depicted in FIG. 8. Accordingly, output light L4 from the LED peripheral region 24 of the light transmissive plate 21 has substantially the same color as that of the output light L3 from the LED overlapping region 23, and a difference in tint is almost eliminated. Preferably, the spectral transmission characteristics of the coloring portion 25 are identical to those of the spectral transmission characteristics of the light reflecting portions 22. However, the respective spectral transmission characteristics may not be identical. It may be considered that the spectral transmission characteristics are substantially the same even if there is a slight difference between the respective spectral transmission characteristics, as long as the effect of sufficiently reducing the difference in tint can be obtained. For example, if the spectral transmission characteristics of the coloring portion 25 and the spectral transmission characteristics of the light reflecting portions 22 differ within a range of ±10%, the difference within the range of ±10% may be considered to be included in being "substantially the same" because the effect of sufficiently reducing the difference in tint can be confirmed.

As described above, the backlight device (lighting device) 12 according to the present embodiment includes: the LEDs (light source) 13; the light transmissive plate 21 opposed to the LEDs 13 with an interval therebetween and being transmissive to light; the light reflecting portions 22 disposed on the plate surface of the light transmissive plate 21, having a higher optical reflectance than an optical transmittance, and providing at least the transmitted light with a specific tint; and the coloring portion 25 disposed on the LEDs 13. The light transmissive plate 21 is sectioned into the LED overlapping region (light source overlapping region) 23 overlapping the LEDs 13, and the LED peripheral region (light source peripheral region) 24 disposed around the LED overlapping region 23. The light reflecting portions 22 are provided so as to have a higher distribution density in the LED overlapping region 23 than in the LED peripheral region 24. The coloring portion 25 colors the light L2 travelling from the LEDs 13 toward the LED peripheral region 24 with a tint having a corresponding color relationship with a specific tint.

Thus, the light reflecting portions 22 are disposed on the plate surface of the light transmissive plate 21 so as to have a higher distribution density in the LED overlapping region 23 than in the LED peripheral region 24. Accordingly, a large portion of the light L1 travelling from the LEDs 13 toward the LED overlapping region 23 is reflected by the light reflecting portions 22 and is made less likely to pass through the LED overlapping region 23. On the other hand, the distribution density of the light reflecting portions 22 are lower in the LED peripheral region 24 of the light transmissive plate 21 than in the LED overlapping region 23. Accordingly, the light L2 travelling from the LEDs 13 toward the LED peripheral region 24, and the light reflected by the light reflecting portions 22 in the LED overlapping region 23 and then travelling toward the LED peripheral region 24 is more likely to pass through the LED peripheral region 24. In this way, it becomes less likely that a difference is caused between the amount of output light from the LED overlapping region 23 and the amount of output light from the LED peripheral region 24. Accordingly, it becomes less likely that luminance unevenness is caused.

The light reflecting portions 22 have the characteristics such that at least the transmitted light therefrom has a specific tint. Thus, color unevenness may be caused in the output light from the light transmissive plate 21. In this respect, the LEDs 13 are provided with the coloring portion 25 for coloring the light L2 travelling from the LEDs 13 toward the LED peripheral region 24. Specifically, the coloring portion 25 colors the light L2 travelling from the LEDs 13 toward the LED peripheral region 24 with a tint having a corresponding color relationship with a specific tint. Since the light reflecting portions 22 are disposed with a lower distribution density in the LED peripheral region 24, only a small portion of the light L2 travelling from the LEDs 13 toward the LED peripheral region 24 passes through the light reflecting portions 22, and the light L2 is less likely to be subjected to the coloring action due to the light reflecting portions 22. In this respect, the light L2 travelling from the LEDs 13 toward the LED peripheral region 24 is colored by means of the coloring portion 25 to have a tint having a corresponding color relationship with a specific tint. In this way, it becomes possible to reduce a difference in tint that may be caused between the output light L4 from the LED peripheral region 24 and the output light L3 from the LED overlapping region 23, which is given a specific tint when passing through the light reflecting portions 22 disposed with a higher distribution density in the LED overlapping region 23. Accordingly, it becomes less likely that color unevenness is caused in the output light from the backlight device 12.

When the LEDs 13 are provided with the second coloring portion 29 and the light travelling from the LEDs 13 toward the LED peripheral region 24 is colored by the coloring portion 25 with a tint having a corresponding color relationship with a specific tint, the second coloring portion 29 colors the light L1 travelling from the LEDs 13 toward the LED overlapping region 23 with a tint having a complementary relationship with a specific tint. In this way, it becomes possible to whiten the tint of the output light L3 from the LED overlapping region 23 by means of the second coloring portion. In this way, color unevenness of the output light from the backlight device 12 can be suppressed and sufficient whitening can be achieved, thus enhancing convenience and the like.

The optical transmittance of the light reflecting portions 22 and the coloring portion 25 has substantially the same wavelength dependency. In this way, when the light reflecting portions 22 have a higher optical transmittance in a specific wavelength region than in the other wavelength regions, the transmitted light from the light reflecting portions 22 has a specific tint. In this respect, while the optical transmittance of the coloring portion 25 has wavelength dependency, the wavelength dependency is substantially the same as that of the optical transmittance of the light reflecting portions 22. Accordingly, it is possible to reduce in a more preferable manner a difference in tint that may be caused between the output light L3 from the LED overlapping region 23 and the output light L4 from the LED peripheral region 24.

The coloring portion 25 also includes a pigment that selectively absorbs light of a specific wavelength region. In this way, compared to if the coloring portion included a dielectric multilayer film that selectively reflects light of a specific wavelength region, cost reduction can be achieved in a preferable manner.

The coloring portion 25 is disposed on the LEDs 13. In this way, it becomes possible to afford the coloring action of the coloring portion 25 to the light emitted from the LEDs 13, and then cause the light to travel toward the LED overlapping region 23 or the LED peripheral region 24 of the light transmissive plate 21.

The LEDs 13 include the top light emitting surface 13A from which light directed mainly toward the LED overlapping region 23 is emitted, and the side light emitting surfaces 13B from which light directed mainly toward the LED peripheral region 24 is emitted. The coloring portion 25 is disposed on the side light emitting surfaces 13B. In this way, the light emitted from the top light emitting surface 13A of the LEDs 13 travels mainly toward the LED overlapping region 23 of the light transmissive plate 21, whereas the light emitted from the side light emitting surfaces 13B of the LEDs 13 travels mainly toward the LED peripheral region 24 of the light transmissive plate 21. The coloring portion 25 is disposed on the side light emitting surfaces 13B. Accordingly, compared to if the coloring portion were arranged on the inner side of the LEDs 13 than the side light emitting surfaces 13B, it becomes possible to reliably afford the coloring action to the light L2 travelling from the LEDs 13 toward the LED peripheral region 24. This is also preferable when the coloring portion 25 is externally mounted to existing LEDs 13.

The liquid crystal display device (display device) 10 according to the present embodiment is provided with the backlight device 12, and the liquid crystal panel (display panel) 11 which displays an image using the light irradiated from the backlight device 12. With the liquid crystal display device 10, in which color unevenness of the output light from the backlight device 12 is suppressed, superior display quality can be obtained.

Second Embodiment

A second embodiment of the technology described herein will be described with reference to FIG. 9. In the second embodiment, the configuration of the coloring portion 125 is modified. Redundant descriptions of structures, operations, and effects similar to those of the first embodiment will be omitted.

Figure 9:
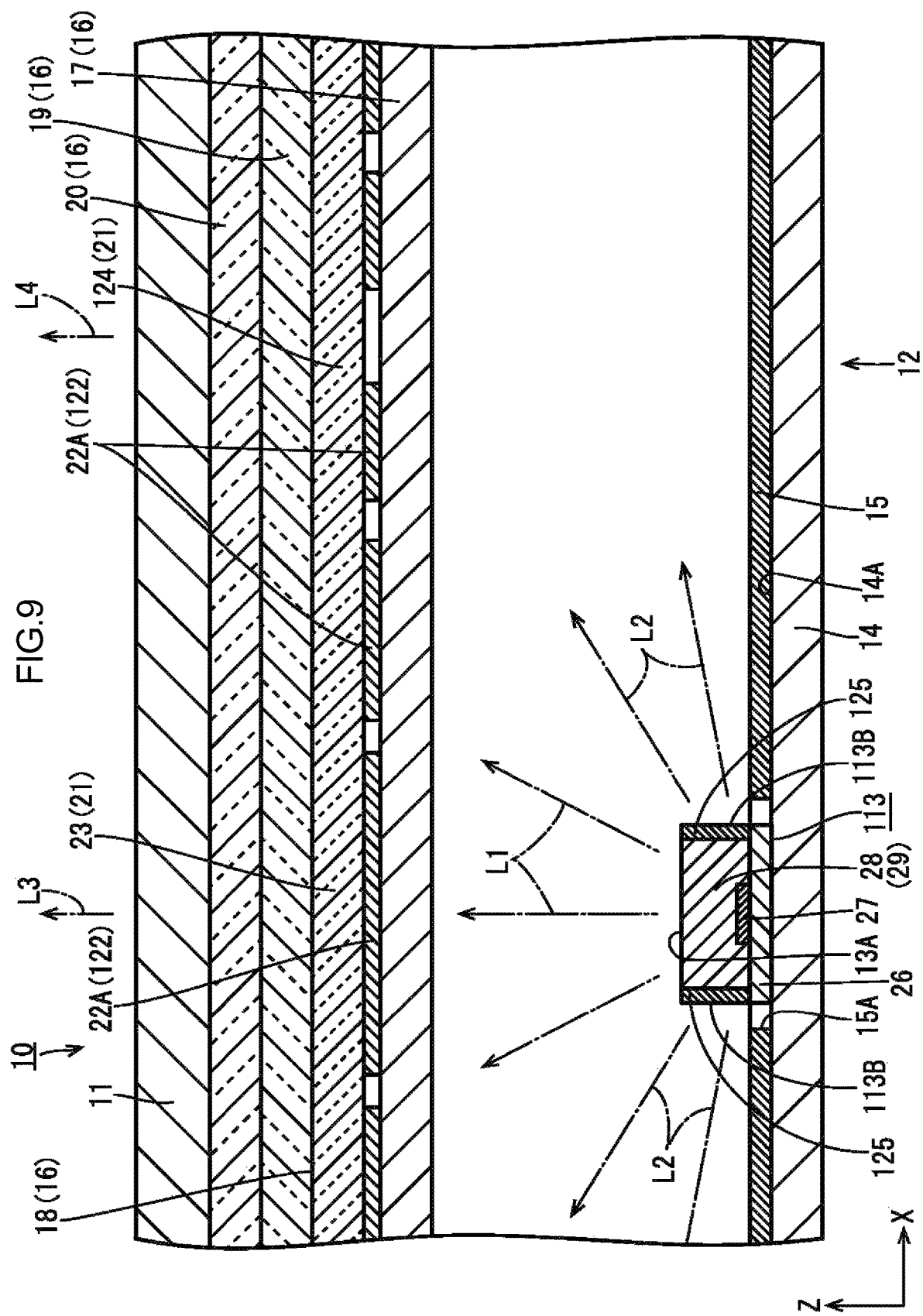
FIG. 9 is a cross sectional view illustrating an LED configuring a backlight device, and light reflecting portions of a light transmissive plate according to a second embodiment.

As illustrated in FIG. 9, the coloring portion 125 according to the present embodiment includes a dielectric multi-layer film which selectively reflects light of a wavelength region belonging to yellow having a corresponding color relationship with yellow that is the tint of the transmitted light from the light reflecting portion 122. For example, the dielectric multilayer film of the coloring portion 125 has a structure in which a number of dielectric layers having a thickness of ¼ the wavelength of visible light and with different refractive indexes are laminated. In the present embodiment, the dielectric multilayer film is substantially transmissive to light of wavelength regions other than that of yellow, and is configured to selectively reflect and suppress the exit of light of the wavelength region belonging to yellow. In this way, the light L2 emitted toward the LED peripheral region from side light emitting surfaces 113B of an LED 113 on which the coloring portion 125 is disposed becomes slightly yellow-tinted white light.

As described above, according to the present embodiment, the coloring portion 125 includes the dielectric multilayer film which selectively reflects the light of a specific wavelength region. In this way, compared to if the coloring portion had a pigment that selectively absorbs light of a specific wavelength region, light utilization efficiency is increased.

Third Embodiment

A third embodiment of the technology described herein will be described with reference to FIG. 10. In the third embodiment, the location at which coloring portions 225 are installed is modified from that of the first embodiment. Redundant descriptions of structures, operations, and effects similar to those of the first embodiment will be omitted.

Figure 10:
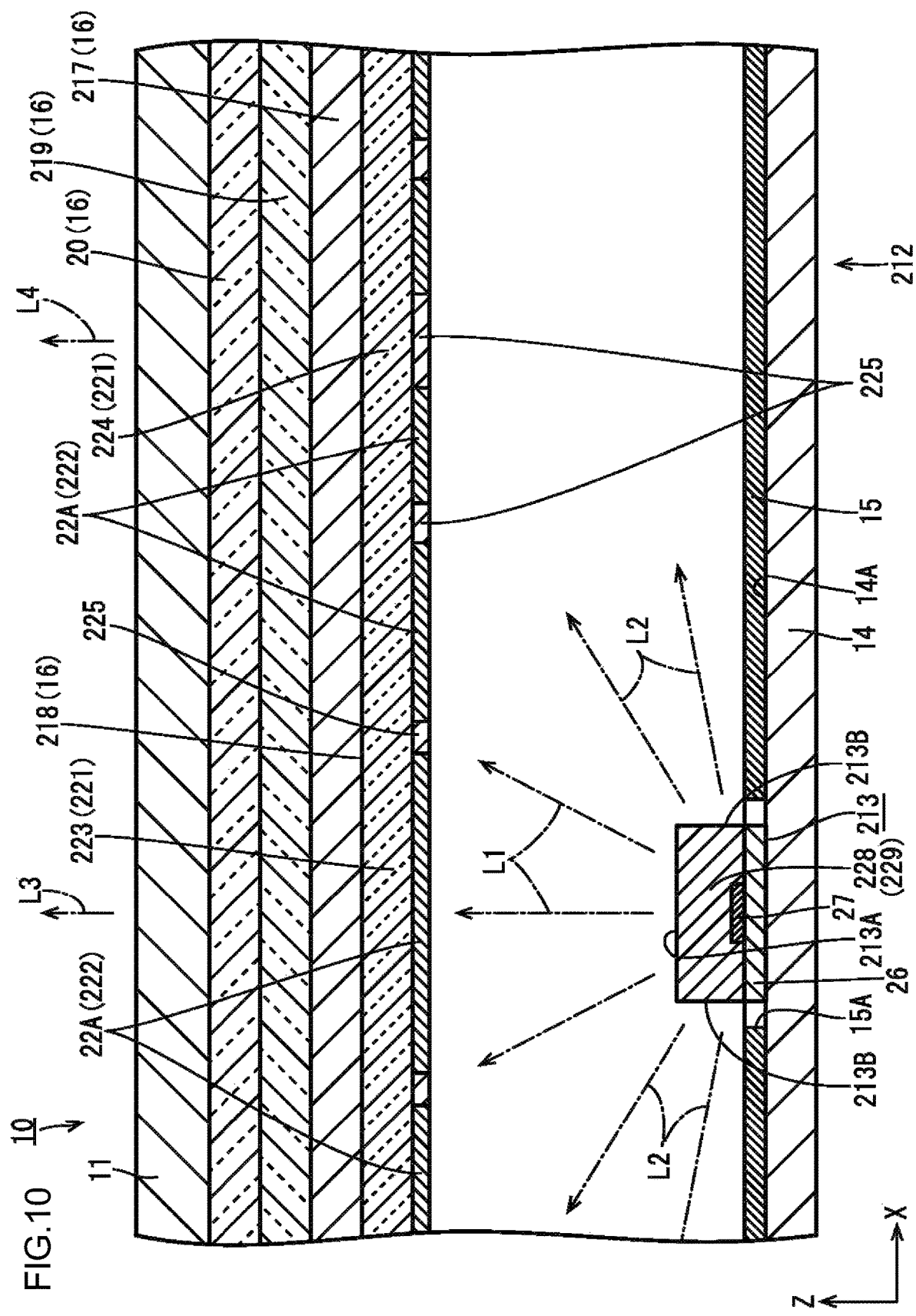
FIG. 10 is a cross sectional view illustrating an LED configuring a backlight device, and light reflecting portions of a light transmissive plate according to a third embodiment.

As illustrated in FIG. 10, the coloring portions 225 according to the present embodiment is disposed not on an LED 213 but on a light transmissive plate 221. The coloring portions 225 are disposed on the plate surface on the back side of the light transmissive plate 221, i.e., on the same plate surface of both plate surfaces as that for the light reflecting portions 222. The coloring portions 225 are disposed in regions on the plate surface on the back side of the light transmissive plate 221 in which the light reflecting portions 222 are not formed. That is, on the plate surface on the back side of the light transmissive plate 221, the region in which the light reflecting portions 222 are formed and the region in which the coloring portions 225 are formed are disposed in a complementary manner. The coloring portions 225 are disposed on the plate surface of the light transmissive plate 221 so as to have a higher distribution density in the LED peripheral region 224 than in the LED overlapping region 223. Preferably, the coloring portions 225 are formed on the plate surface of the light transmissive plate 221 by the same printing method or vapor deposition as for the light reflecting portions 222. As the coloring portions 225 are disposed on the light transmissive plate 221, the configuration of the LED 213 is modified from that of the first embodiment. The LED 213 emits white light having a slightly bluish tint due to the coloring action of a sealing material 228 that is a second coloring portion 229, via both a top light emitting surface 213A and side light emitting surfaces 213B. The light L1 travelling form the top light emitting surface 213A of the LED 213 toward the LED overlapping region 223 of the light transmissive plate 221 is subjected to the coloring action of the light reflecting portions 222 while passing through the light reflecting portions 222, and thereby becomes white light having virtually no specific tint. On the other hand, the light L2 travelling from the side light emitting surfaces 213B of the LED 213 toward the LED peripheral region 224 of the light transmissive plate 221, and the light that has been reflected by the light reflecting portions 222 in the LED overlapping region 223 and has reached the LED peripheral region 224, are subjected to a coloring action giving a yellow tint while passing through the coloring portions 225 disposed therein with a higher distribution density than in the LED overlapping region 223. As a result, the light L2 and the other light become white light having virtually no specific tint. In this way, both the output light L3 from the LED overlapping region 223 and the output light L4 from the LED peripheral region 224 become white light having virtually no specific tint. Accordingly, color unevenness can be suppressed in a preferable manner. In addition, a light transmitting function-equipped reflective sheet 218 according to the present embodiment is disposed on the backmost side with respect to the other optical sheets 217, 219, 220.

As described above, according to the present embodiment, the coloring portions 225 disposed on the light transmissive plate 221 color the light L2 travelling from the LED 213 toward the LED peripheral region 224 with a tint having a corresponding color relationship with a specific tint. In this way, when the light emitted from the LED 213 reaches the light transmissive plate 221, the coloring action is afforded by the coloring portions 225. Compared to the LED 213, the light transmissive plate 221 is a large component. Accordingly, compared to if the coloring portion were disposed on the LED 213, the cost for installing the coloring portions 225 can be reduced. This is particularly effective when a large number of LEDs 213 are installed.

The coloring portions 225 are disposed on the same plate surface of the light transmissive plate 221 as that for the light reflecting portions 222. If the coloring portions and the light reflecting portions were disposed on different plate surfaces of the light transmissive plate 221, it would be necessary to protect both plate surfaces until the light transmissive plate 221 that has been manufactured is assembled onto the backlight device 212. On the other hand, when the coloring portions 225 and the light reflecting portions 222 are disposed on the same plate surface of the light transmissive plate 221, such need is eliminated, and manufacturing cost can be decreased in a preferable manner.

The coloring portions 225 are disposed in regions of the light transmissive plate 221 in which the light reflecting portions 222 are not formed. In this way, compared to if the coloring portions were disposed so as to overlap the light reflecting portions 222, the plate surface of the light transmissive plate 221 can be made smooth in a preferable manner, and also the light transmissive plate 221 can be kept thin in a preferable manner.

Fourth Embodiment

A fourth embodiment of the technology described herein will be described with reference to FIG. 11. In the fourth embodiment, the configuration of an LED 313 is modified from the first embodiment. Redundant descriptions of structures, operations, and effects similar to those of the first embodiment will be omitted.

Figure 11:
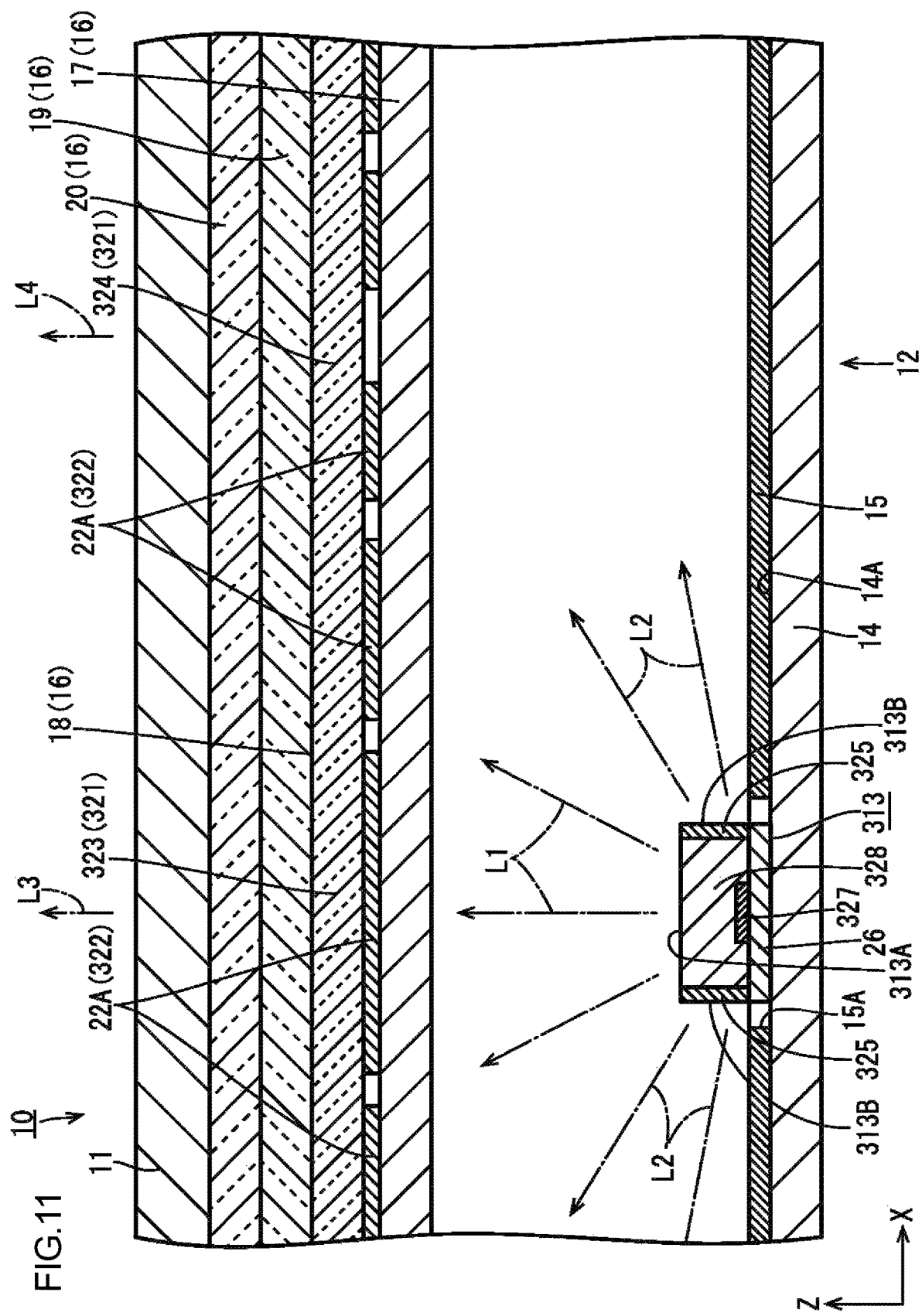
FIG. 11 is a cross sectional view illustrating an LED configuring a backlight device, and light reflecting portions of a light transmissive plate according to a fourth embodiment.

As illustrated in FIG. 11, the LED 313 according to the present embodiment includes an LED element 327 that emits blue light, and a sealing material 328 that includes a phosphor. The content of the phosphor, for example, is adjusted such that white light having virtually no specific tint is emitted using the blue light from the LED element 327 and the light emitted from the phosphor included in the sealing material 328. That is, in the present embodiment, the sealing material 328 does not function as the "second coloring portion" described in the first embodiment. Accordingly, the light L1 travelling from a top light emitting surface 313A of the LED 313 toward an LED overlapping region 323 of a light transmissive plate 321 becomes white light having virtually no specific tint. The light L1 is then subjected to a coloring action when passing through light reflecting portions 322 disposed with a high distribution density in the LED overlapping region 323 of the light transmissive plate 321. Accordingly, an output light L3 from the LED overlapping region 323 becomes slightly yellow-tinted white light. Meanwhile, the light L2 travelling from side light emitting surfaces 313B of the LED 313 toward an LED peripheral region 324 of the light transmissive plate 321 is subjected to a coloring action due to coloring portions 325, and becomes slightly yellow-tinted white light. While the light that reaches the LED peripheral region 324 includes light that has been reflected by the light reflecting portions 322 in the LED overlapping region 323, in addition to the light L2, the output light L3 from the LED overlapping region 323 becomes slightly yellow-tinted white light. In this way, both the output light L3 from the LED overlapping region 323 and the output light L4 from the LED peripheral region 324 become slightly yellow-tinted white light. Accordingly, color unevenness can be suppressed in a preferable manner.

Reference Example 1

Reference example 1 will be described with reference to FIG. 12. In reference example 1, the characteristics and the like of light reflecting portions 422 are modified from the first embodiment. Redundant descriptions of structures, operations, and effects similar to those of the first embodiment will be omitted.

Figure 12:
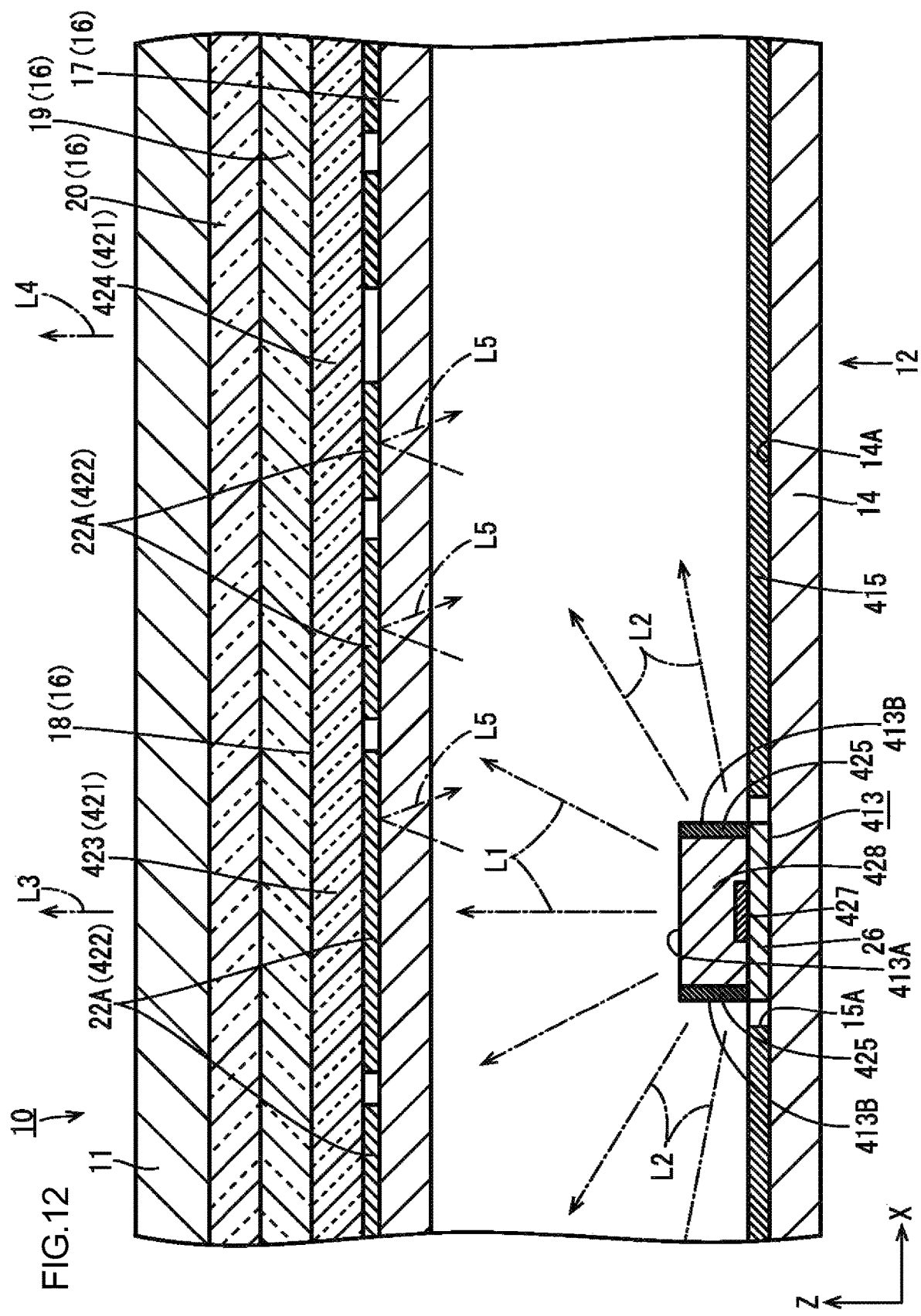
FIG. 12 is a cross sectional view illustrating an LED configuring a backlight device, and light reflecting portions of a light transmissive plate according to reference example 1.

As illustrated in FIG. 12, the light reflecting portions 422 according to the present reference example include a material having characteristics that tend to cause color unevenness such that, while transmitted light is given virtually no specific tint, reflected light is given a yellow tint. Specifically, in the light reflecting portions 422 according to the present reference example, the optical reflectance has wavelength dependency such that the optical reflectance is selectively high (optical absorbance is low) with respect to light of a wavelength region belonging to yellow, and the optical reflectance is low (optical absorbance is high) with respect to light of a wavelength region belonging to colors other than yellow (blue and red). Because the light reflecting portions 422 afford such coloring action to the reflected light, color unevenness may be caused in the output light from a light transmissive plate 421. Accordingly, in the present reference example, coloring portions 425 are disposed on an LED 413 to color the light L2 travelling from the LED 413 toward an LED peripheral region 424 with the tint of blue that has a complementary relationship with the tint of yellow of the transmitted light from the light reflecting portions 422. The coloring portions 425 are made of a substantially transparent synthetic resin material containing a predetermined concentration of a blue pigment. The pigment selectively absorbs light (green light, yellow light, and red light) of wavelength regions other than the wavelength region belonging to blue. The coloring portions 425 are disposed on side light emitting surfaces 413B of the LED 413, as in the first embodiment.

The LED 413 includes an LED element 427 that emits blue light, and a sealing material 428 including a phosphor. For example, the content of the phosphor is adjusted such that white light having virtually no specific tint is emitted using the blue light from the LED element 427 and light emitted from the phosphor included in the sealing material 428. That is, in the present reference example, the sealing material 428 does not function as the "second coloring portion" described in the first embodiment. Accordingly, the light L1 travelling from a top light emitting surface 413A of the LED 413 to an LED overlapping region 423 of the light transmissive plate 421 becomes white light having virtually no specific tint. Some of the light L1 is not subjected to the coloring action when passing through the light reflecting portions 422 disposed with a high distribution density in the LED overlapping region 423 of the light transmissive plate 421. Accordingly, the output light L3 from the LED overlapping region 423 becomes white light having virtually no specific tint. Meanwhile, most of the light L1 is subjected to the coloring action when reflected by the light reflecting portions 422 disposed with a high distribution density in the LED overlapping region 423 of the light transmissive plate 421. The reflected light L5 is repeatedly returned to a reflective sheet 415, reflected thereby, and again reflected by the light reflecting portions 422. In this way, the yellow tint is gradually increased before the light reaches the LED peripheral region 424.

In this respect, the coloring portions 425 are disposed on the side light emitting surfaces 413B of the LED 413. Accordingly, the light L2 travelling from the side light emitting surfaces 413B of the LED 413 toward the LED peripheral region 424 is subjected to the coloring action due to the coloring portions 425, and becomes white light having a blue tint. Thus, the output light L4 from the LED peripheral region 424 includes the light having a yellow tint that has been repeatedly subjected to the coloring action due to the light reflecting portions 422, and the light having a blue tint that has been subjected to the coloring action due to the coloring portions 425. Accordingly, the output light L4 as a whole becomes white light having virtually no specific tint. In this way, both the output light L3 from the LED overlapping region 423 and the output light L4 from the LED peripheral region 424 become white light having virtually no specific tint. Accordingly, color unevenness can be suppressed in a preferable manner.

As described above, according to the present reference example, the coloring portions 425 disposed on the LED 413 color the light L2 travelling from the LED 413 toward the LED peripheral region 424 with a tint having a complementary relationship with a specific tint. In this way, more of the light L1 travelling from the LED 413 toward the LED overlapping region 423 is repeatedly reflected by the light reflecting portions 422 disposed with a high distribution density in the LED overlapping region 423, returned to the LED 413, and then again reflected by the light reflecting portions 422, eventually reaching the LED peripheral region 424. Accordingly, the light that has reached the LED peripheral region 424 is more likely to have a specific tint due to the repeated reflections by the light reflecting portions 422. In this respect, when the light L2 travelling from the LED 413 toward the LED peripheral region 424 is colored by the coloring portions 425 with a tint having a complementary relationship with a specific tint, the output light from the LED peripheral region 424 is whitened. In this way, it becomes possible to reduce a difference in tint that may be caused between the output light from the LED peripheral region 424 and the output light from the LED overlapping region 423.

The light reflecting portions 422 and the coloring portions 425 have substantially the same wavelength dependency with respect to the optical transmittance or optical reflectance. In this way, in the light reflecting portions 422, when the reflectance with respect to light of a specific wavelength region is higher than the reflectance with respect to light of the other wavelength regions, the reflected light from the light reflecting portions 422 has a specific tint. On the other hand, the coloring portions 425, while the optical transmittance thereof has wavelength dependency, the wavelength dependency is substantially the same as that of the optical reflectance of the light reflecting portions 422. Accordingly, it becomes possible to reduce a difference in tint that may be caused between the output light L3 from the LED overlapping region 423 and the output light L4 from the LED peripheral region 424 in a more preferable manner.

Reference Example 2

Reference example 2 will be described with reference to FIG. 13. In reference example 2, the location at which coloring portions 525 are installed is modified from that of reference example 1, as in the third embodiment. Redundant descriptions of structures, operations, and effects similar to those of reference example 1 and the third embodiment will be omitted.

Figure 13:
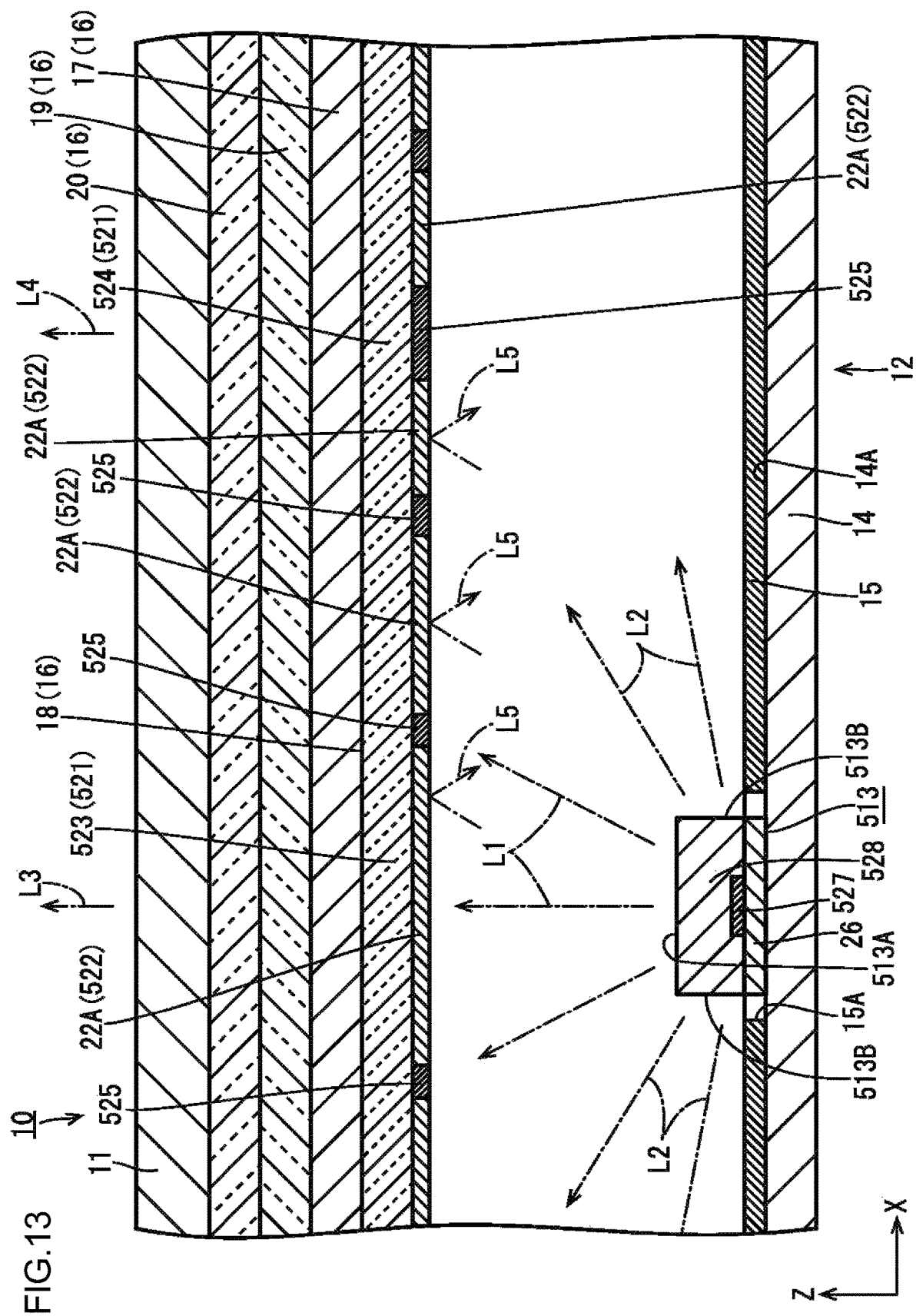
FIG. 13 is a cross sectional view illustrating an LED configuring a backlight device, and light reflecting portions of a light transmissive plate according to reference example 2.

As illustrated in FIG. 13, the coloring portions 525 according to the present reference example are disposed on a light transmissive plate 521 rather than an LED 513. The coloring portions 525, as in the third embodiment, are disposed on the same plate surface as that for light reflecting portions 522 of the light transmissive plate 521 in regions in which the light reflecting portions 522 are not formed. The coloring portions 525 are disposed on the plate surface of the light transmissive plate 521 so as to have a higher distribution density in an LED peripheral region 524 than in an LED overlapping region 523. The LED 513, which does not include the coloring portions 525, includes, as in reference example 1, an LED element 527 that emits blue light and a sealing material 528 including a phosphor. For example, the content of the phosphor is adjusted such that white light having virtually no specific tint is emitted using the blue light from the LED element 527 and light emitted from the phosphor included in the sealing material 528. Thus, the LED 513 emits white light having virtually no specific tint form both a top light emitting surface 513A and side light emitting surfaces 513B. Some of the light L1 travelling from the top light emitting surface 513A of the LED 513 toward the LED overlapping region 523 of the light transmissive plate 521 is not subjected to the coloring action when passing through the light reflecting portions 522, and becomes the output light L3 from the LED overlapping region 523. On the other hand, most of the light L1 is repeatedly reflected while being subjected to the coloring action due to the light reflecting portions 522, and reaches the LED peripheral region 524 in a yellow tinted state. However, in the regions of the LED peripheral region 524 in which the light reflecting portions 522 are not formed, the coloring portions 525 are disposed with a higher distribution density than in the LED overlapping region 523. Accordingly, the reflected light L5 due to the light reflecting portions 522 is subjected to the coloring action and given a blue tint when passing through the coloring portions 525, thereby becoming white light having virtually no specific tint. On the other hand, the light L2 travelling from the side light emitting surfaces 513B of the LED 513 toward the LED peripheral region 524 of the light transmissive plate 521 is white light having virtually no specific tint. Thus, both the output light L3 from the LED overlapping region 523 and the output light L4 from the LED peripheral region 524 become white light having virtually no specific tint. Accordingly, color unevenness can be suppressed in a preferable manner.

As described above, according to the present reference example, the coloring portions 525 disposed on the light transmissive plate 521 color the light L2 travelling from the LED 513 toward the LED peripheral region 524 with a tint having a complementary relationship with a specific tint. In this way, more of the light L1 travelling from the LED 513 toward the LED overlapping region 523 is repeatedly reflected by the light reflecting portions 522 disposed with a high distribution density in the LED overlapping region 523, returned to the LED 513, and then again reflected by the light reflecting portions 522, eventually reaching the LED peripheral region 524. Accordingly, the light that has reached the LED peripheral region 524 is more likely to have a specific tint due to the repeated reflections by the light reflecting portions 522. In this respect, when the light L2 travelling from the LED 513 toward the LED peripheral region 524 is colored by the coloring portions 525 with a tint having a complementary relationship with a specific tint, the output light from the LED peripheral region 524 is whitened. Accordingly, it becomes possible to reduce a difference in tint that may be caused between the output light from the LED peripheral region 524 and the output light from the LED overlapping region 523.

Reference Example 3

Reference example 3 will be described with reference to FIG. 14. In reference example 3, the configuration of an LED 613 is modified from reference example 1. Redundant descriptions of structures, operations, and effects similar to those of reference example 1 will be omitted.

Figure 14:
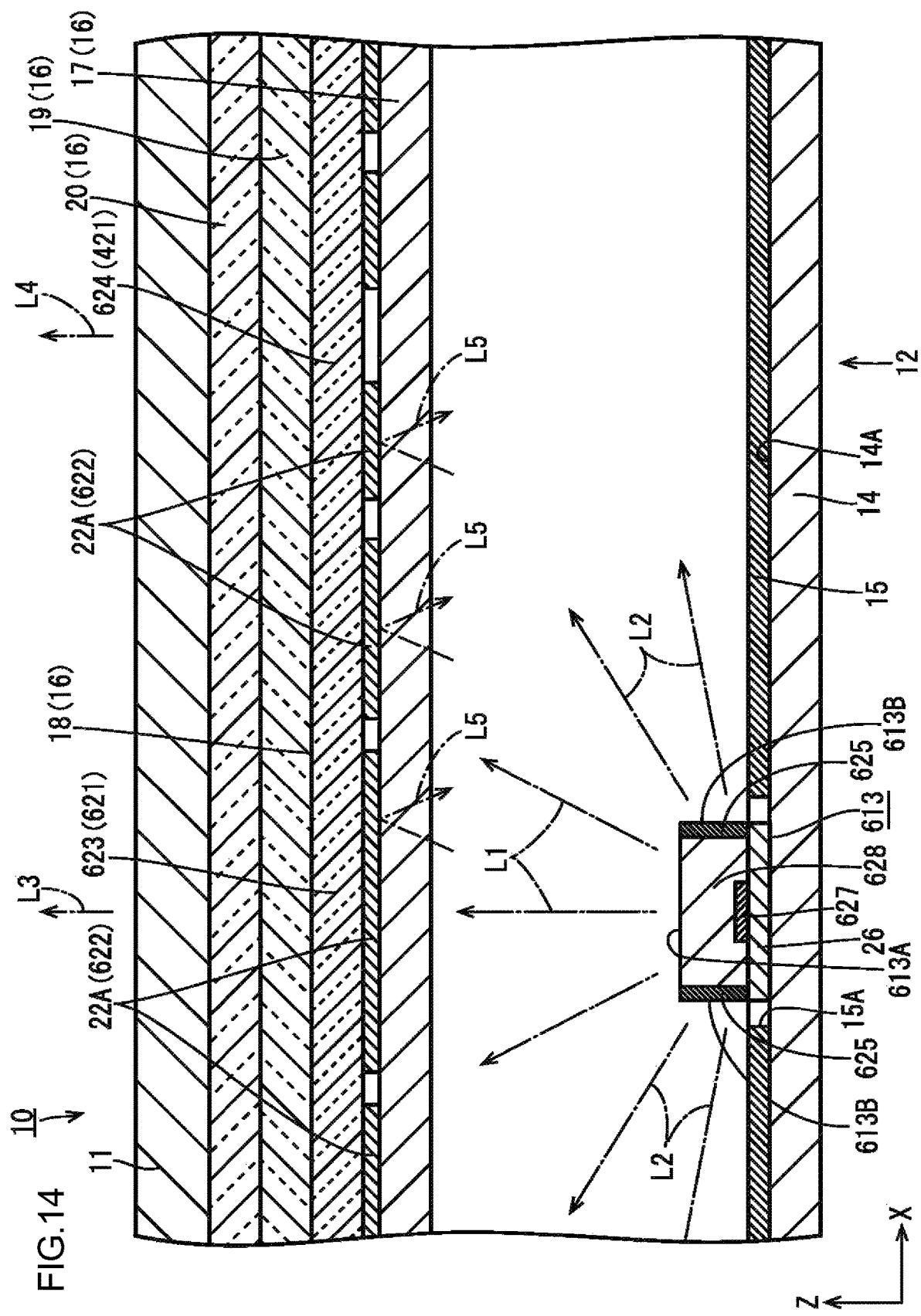
FIG. 14 is a cross sectional view illustrating an LED configuring a backlight device, and light reflecting portions of a light transmissive plate according to reference example 3.

As illustrated in FIG. 14, the LED 613 according to the present reference example includes an LED element 627 that emits blue light and a sealing material 628 that includes a phosphor. For example, the content of the phosphor is adjusted such that slightly yellow-tinted white light is emitted using the blue light from the LED element 627 and light emitted from the phosphor included in the sealing material 628. Thus, the light L1 travelling from a top light emitting surface 613A of the LED 613 toward an LED overlapping region 623 of a light transmissive plate 621 becomes slightly yellow-tinted white light, of which some passes through light reflecting portions 622 and becomes the output light L3 from the LED overlapping region 623. On the other hand, most of the slightly yellow-tinted white light is repeatedly reflected while being subjected to the coloring action due to the light reflecting portions 622, and reaches the LED peripheral region 624 in a more yellow tinted state. Meanwhile, the light L2 travelling from side light emitting surfaces 613B of the LED 613 toward an LED peripheral region 624 of the light transmissive plate 621 is subjected to the coloring action and given a blue tint due to coloring portions 625, and becomes white light having virtually no specific tint. Accordingly, the output light L4 from the LED peripheral region 624 includes light having a strong yellow tint due to having been repeatedly subjected to the coloring action of the light reflecting portions 622, and the white light having virtually no specific tint having been subjected to the coloring action due to the coloring portions 625. Thus, the output light L4 as a whole becomes slightly yellow-tinted white light. In this way, the output light L3 from the LED overlapping region 623 and the output light L4 from the LED peripheral region 624 both become slightly yellow-tinted white light. Accordingly, color unevenness can be suppressed in a preferable manner.

Other Embodiments

The technology described herein is not limited to the embodiments described above with reference to the drawings. The following embodiments may be included in the technical scope.

Figure 15:
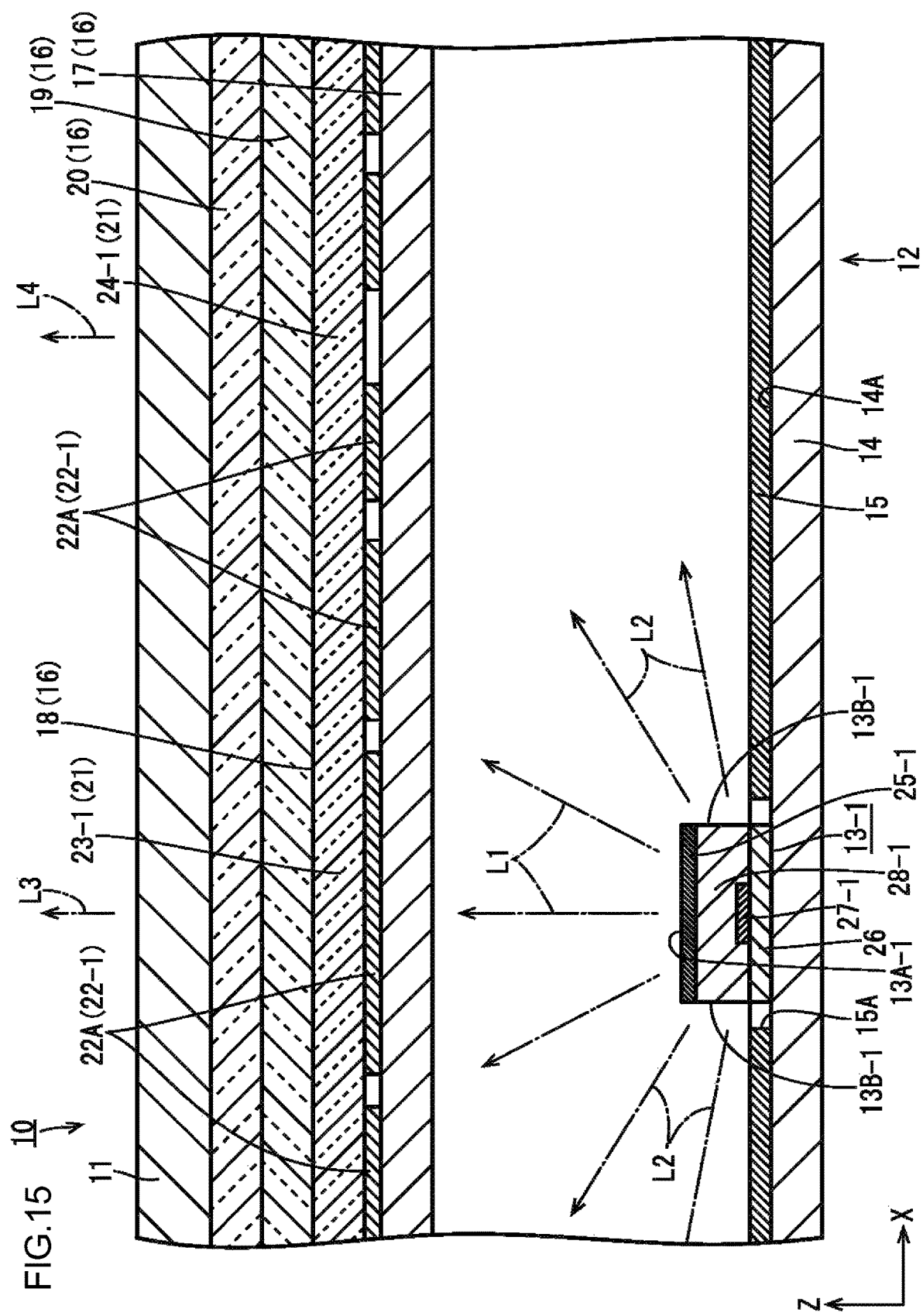
FIG. 15 is a cross sectional view illustrating an LED configuring a backlight device, and light reflecting portions of a light transmissive plate according to a modification of the first embodiment.

(1) In a modification of the first embodiment, as illustrated in FIG. 15, a coloring portion 25-1 may be disposed on a top light emitting surface 13A-1 of an LED 13-1. In this case, the coloring portion 25-1 is configured to color the light L1 travelling from the LED 13-1 toward an LED overlapping region 23-1 with the tint of blue having a complementary relationship with the tint of yellow of the transmitted light from light reflecting portions 22-1. The LED 13-1 includes an LED element 27-1 that emits blue light, and a sealing material 28-1 including a phosphor. For example, the content of the phosphor is adjusted such that white light having virtually no specific tint is emitted using the blue light from the LED element 27-1 and light emitted from the phosphor. In this way, the light L1 travelling from the top light emitting surface 13A-1 of the LED 13-1 toward the LED overlapping region 23-1 is subjected to the coloring action due to the coloring portion 25-1 and given a blue tint. When passing through the light reflecting portions 22-1, the light L1 is subjected to the coloring action of the light reflecting portions 22-1 and given a yellow tint. Accordingly, the output light L3 from the LED overlapping region 23-1 becomes white light having virtually no specific tint. Meanwhile, the light L2 travelling from side light emitting surfaces 13B-1 of the LED 13-1 toward an LED peripheral region 24-1 becomes slightly yellow-tinted white light, and the output light L4 from the LED peripheral region 24-1 becomes white light having virtually no specific tint. Thus, the output light L3 from the LED overlapping region 23-1 and the output light L4 from the LED peripheral region 24-1 both become white light having virtually no specific tint.

Figure 16:
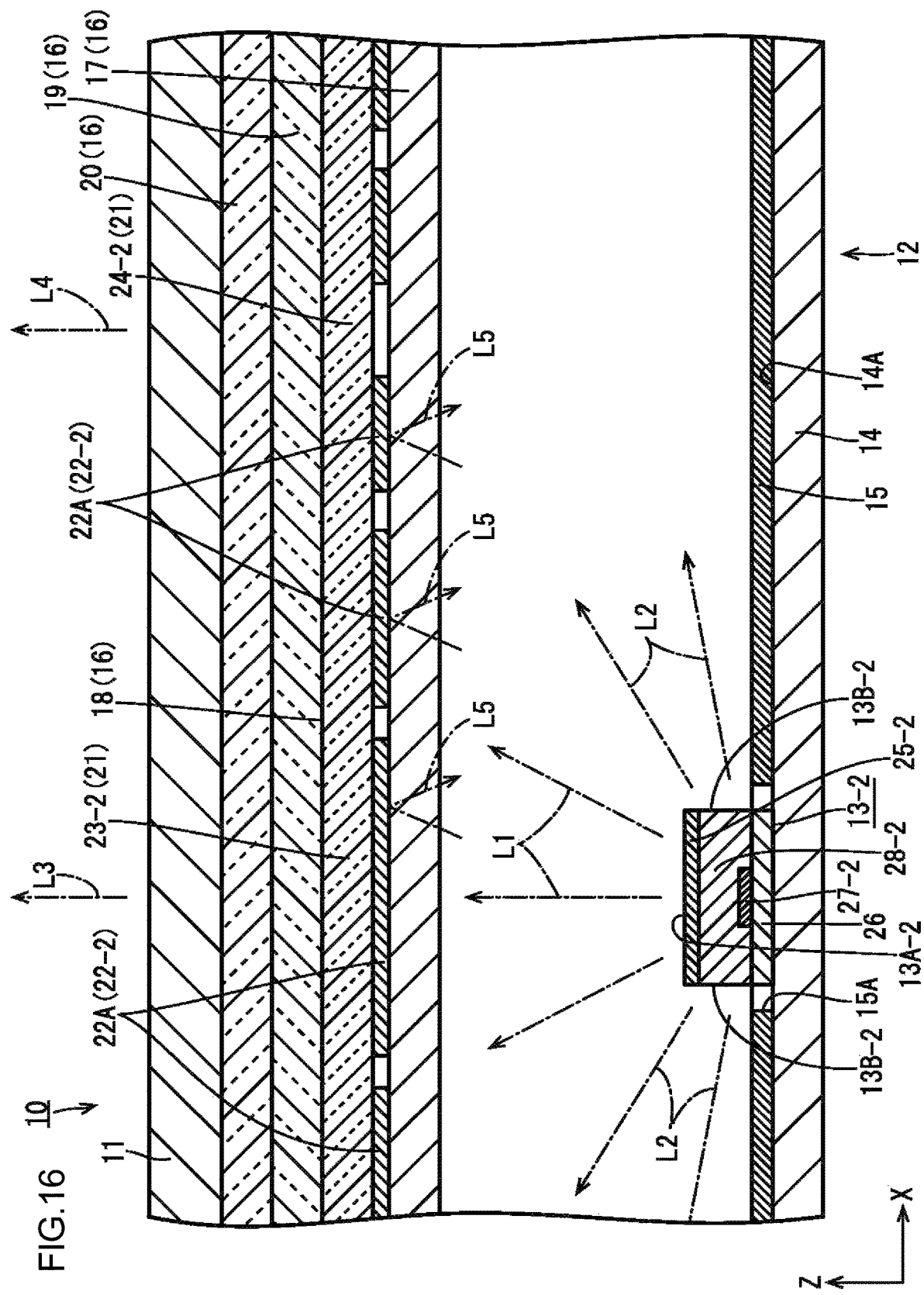
FIG. 16 is a cross sectional view illustrating an LED configuring a backlight device, and light reflecting portions of a light transmissive plate according to a modification of reference example 1.

(2) In a modification of reference example 1, as illustrated in FIG. 16, a coloring portion 25-2 may be disposed on a top light emitting surface 13A-2 of an LED 13-2. In this case, the coloring portion 25-2 is configured to color the light L1 travelling from the LED 13-2 toward an LED overlapping region 23-2 with the tint of yellow having a corresponding color relationship with the tint of yellow of reflected light due to light reflecting portions 22-2. The LED 13-2 includes an LED element 27-2 that emits blue light and a sealing material 28-2 including a phosphor. For example, the content of the phosphor is adjusted such that white light having a slightly bluish tint is emitted using the blue light emitted from the LED element 27-2 and light emitted from the phosphor. In this way, the light L1 travelling from the top light emitting surface 13A-2 of the LED 13-2 toward the LED overlapping region 23-2 is subjected to the coloring action due to the coloring portion 25-2, and becomes white light having virtually no specific tint. Some of the white light passes through the light reflecting portions 22-2 and becomes the output light L3 from the LED overlapping region 23-2. Most of the white light is repeatedly reflected while being subjected to the coloring action due to the light reflecting portions 22-2, and reaches an LED peripheral region 24-2. Meanwhile, the light L2 travelling from side light emitting surfaces 13B-2 of the LED 13-2 toward the LED peripheral region 24-2 becomes white light having a slightly bluish tint. Accordingly, the output light L4 from the LED peripheral region 24-2 includes the light having a yellow tint that has been repeatedly subjected to the coloring action due to the light reflecting portions 22-2, and the white light having a slightly bluish tint from the side light emitting surfaces 13B-2 of the LED 13-2. Thus, the output light L4 as a whole becomes white light having virtually no specific tint. In this way, the output light L3 from the LED overlapping region 23-2 and the output light L4 from the LED peripheral region 24-2 both become white light having virtually no specific tint.

(3) The coloring portion is not necessarily limited to the same color as the tint of the transmitted light from the light reflecting portion, and it is possible to use a coloring portion presenting a similar color.

(4) The coloring portion is not necessarily limited to the same color as the tint of the reflected light from the light reflecting portion, and it is possible to use a coloring portion presenting a similar color.

(5) It is of course possible to apply the coloring portion having the dielectric multilayer film described with reference to the second embodiment in the configuration of the third embodiment or the fourth embodiment, for example.

(6) It is also possible to dispose a coloring portion presenting blue on the top light emitting surface of the LED. In this case, preferably the LED includes an LED element that emits blue light and a sealing material including a phosphor, in which the content of the phosphor, for example, is adjusted such that white light having virtually no specific tint is emitted using the blue light and light emitted from the phosphor.

(7) It is also possible to dispose a coloring portion presenting yellow on the top light emitting surface of the LED. In this case, preferably the LED includes an LED element that emits blue light and a sealing material including a phosphor, in which, for example, the content of the phosphor is adjusted such that white light having virtually no specific tint is emitted using the blue light and light emitted from the phosphor.

(8) It is also possible to dispose a coloring portion on both the top light emitting surface and the side light emitting surfaces of the LED.

(9) It is also possible to dispose a coloring portion on both the LED and the light transmissive plate.

(10) The coloring portion may be disposed on the plate surface of the light transmissive plate on the opposite side from the light reflecting portion.

(11) The coloring portion may be disposed on the light transmissive plate in a region in which a light reflecting portion is formed. In this case, the coloring portion may be disposed straddling across the region in which the light reflecting portion is formed and a region in which the light reflecting portion is not formed, or may be disposed mainly in the region in which the light reflecting portion is formed. In either case, at least some of the coloring portion is arranged to overlap the light reflecting portion.

(12) It is also possible to dispose the light reflecting portion on the plate surface of the light transmissive plate on the front side (opposite side from the LED side).

(13) The light transmissive plate on which the light reflecting portion is disposed may include a diffusing sheet or a diffusing plate, for example, that affords a diffusing action to the transmitted light. The light transmissive plate may also be configured to afford a light collecting action or a polarization reflecting action to transmitted light.

(14) The top light emitting surface and/or the side light emitting surfaces of the LED may have a non-flat shape, such as a curved shape.

(15) The specific type and the number of the optical sheets, and the order in which the optical sheets are laminated may be modified, as appropriate. In addition to the optical sheets, it is also possible to use a diffusing plate having a large thickness on the order of 3 mm, for example.

(16) The technology described herein is applicable in various types of display panels other than a liquid crystal panel, such as a micro electro mechanical systems (MEMS) display panel.

(17) The specific planar shape of the light reflecting dots configuring the light reflecting portion is not limited to circular, and may include other shapes, such as triangular, rectangular, oval, ellipse, semicircular, rhombic, trapezoidal, pentagonal and other polygonal shapes, as appropriate.

(18) It is possible to use in the light reflecting portion a material that provides transmitted light with a specific tint but that does not color reflected light with a specific tint. The tint given to the transmitted light or reflected light may vary, as appropriate, depending on the material.

The invention claimed is:

1. A lighting device comprising:
 a light source;
 a light transmissive plate opposed to the light source with an interval therebetween and being transmissive to light;
 a plurality of light reflecting portions disposed on a plate surface of the light transmissive plate, having a higher optical reflectance than an optical transmittance, and providing at least transmitted light with a specific tint; and
 a coloring portion disposed on at least one of the light source and the light transmissive plate, wherein
 the light transmissive plate is sectioned into a light source overlapping region overlapping the light source and a light source peripheral region disposed around the light source overlapping region,
 the plurality of light reflecting portions comprises reflecting dots and the distribution density of the reflecting dots is higher in the light source overlapping region than in the light source peripheral region, and the coloring portion colors light travelling from the light source toward the light source peripheral region with a tint having a corresponding or similar color relationship with the specific tint.

2. The lighting device according to claim 1, further comprising another coloring portion disposed on at least one of the light source and the light transmissive plate, wherein the another coloring portion colors the light travelling from the light source toward the light source overlapping region with a tint having a complementary relationship with the specific tint.

3. The lighting device according to claim 1, wherein the plurality of light reflecting portions and the coloring portion have substantially the same wavelength dependency with respect to optical transmittance.

4. The lighting device according to claim 1, wherein the coloring portion includes a pigment that selectively absorbs light of a specific wavelength region.

5. The lighting device according to claim 1, wherein the coloring portion includes a dielectric multilayer film that selectively reflects light of a specific wavelength region.

6. The lighting device according to claim 1, wherein the coloring portion is disposed on the light source.

7. The lighting device according to claim 6, wherein the light source includes a top light emitting surface emitting light mainly directed to the light source overlapping region, and a side light emitting surface emitting light mainly directed to the light source peripheral region, and the coloring portion is disposed on the top light emitting surface or the side light emitting surface.

8. The lighting device according to claim 1, wherein the coloring portion is disposed on the light transmissive plate.

9. The lighting device according to claim 8, wherein the coloring portion and the light reflecting portion are disposed on a same plate surface of the light transmissive plate.

10. The lighting device according to claim 9, wherein the coloring portion is disposed in a region of the light transmissive plate in which the light reflecting portion is not formed.

11. A display device comprising:

the lighting device according to claim 1; and a display panel displaying an image using light irradiated from the lighting device.

\* \* \* \* \*